(12) United States Patent
Huang et al.

(10) Patent No.: US 11,570,644 B2
(45) Date of Patent: Jan. 31, 2023

(54) METHOD, EQUIPMENT AND STORAGE MEDIUM FOR DEVICE TO DEVICE (D2D) RESOURCE POOL MEASUREMENT AND REPORTING

(71) Applicant: ZTE Corporation, Guangdong (CN)

(72) Inventors: Ying Huang, Shenzhen (CN); Yin Gao, Shenzhen (CN); Lin Chen, Shenzhen (CN); Feng Xie, Shenzhen (CN); Shuanshuan Wu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 163 days.

(21) Appl. No.: 15/329,482

(22) PCT Filed: Sep. 25, 2014

(86) PCT No.: PCT/CN2014/087467
§ 371 (c)(1),
(2) Date: Jan. 26, 2017

(87) PCT Pub. No.: WO2016/019620
PCT Pub. Date: Feb. 11, 2016

(65) Prior Publication Data
US 2017/0215098 A1   Jul. 27, 2017

(30) Foreign Application Priority Data
Aug. 8, 2014   (CN) .......................... 201410391654.1

(51) Int. Cl.
*H04W 4/70*  (2018.01)
*H04W 24/10*  (2009.01)
(Continued)

(52) U.S. Cl.
CPC ........... *H04W 24/10* (2013.01); *H04W 72/04* (2013.01); *H04W 72/0413* (2013.01);
(Continued)

(58) Field of Classification Search
None
See application file for complete search history.

(56) References Cited

U.S. PATENT DOCUMENTS

| 7,756,101 | B2 | 7/2010 | Tervonen |
| 2007/0153717 | A1 | 7/2007 | Tervonen |

(Continued)

FOREIGN PATENT DOCUMENTS

| CN | 102783211 A | 11/2012 |
| CN | 103141149 A | 6/2013 |

(Continued)

OTHER PUBLICATIONS

International Search Report in international application No. PCT/CN2014/087467, dated Apr. 29, 2015, 2 pgs.
(Continued)

*Primary Examiner* — Duc T Duong
(74) *Attorney, Agent, or Firm* — Cantor Colburn LLP

(57) ABSTRACT

The disclosure discloses a method for Device to Device (D2D) resource pool measurement and reporting. A User Equipment (UE) measures a D2D resource pool, and sends measurement information of the D2D resource pool. The disclosure also discloses another method, Evolved Node B (eNodeB), UE and storage medium for D2D resource pool measurement and reporting.

16 Claims, 7 Drawing Sheets

(51) Int. Cl.
*H04W 72/04* (2009.01)
*H04W 76/14* (2018.01)
*H04W 8/00* (2009.01)
*H04W 92/14* (2009.01)
*H04W 92/20* (2009.01)

(52) U.S. Cl.
CPC ....... *H04W 72/0426* (2013.01); *H04W 76/14* (2018.02); *H04W 8/005* (2013.01); *H04W 92/14* (2013.01); *H04W 92/20* (2013.01); *Y02D 30/70* (2020.08)

(56) References Cited

U.S. PATENT DOCUMENTS

| | | |
|---|---|---|
| 2012/0044815 A1 | 2/2012 | Geirhofer |
| 2013/0170468 A1 | 7/2013 | Baker |
| 2014/0056220 A1 | 2/2014 | Poitau et al. |
| 2014/0094183 A1* | 4/2014 | Gao .................. H04W 72/048 455/450 |
| 2014/0301228 A1* | 10/2014 | Kwak ................ H04W 76/14 370/252 |
| 2015/0024763 A1* | 1/2015 | Lee .................. H04W 72/082 455/450 |
| 2015/0271840 A1* | 9/2015 | Tavildar .................. H04L 1/08 370/329 |
| 2015/0271861 A1* | 9/2015 | Li ...................... H04W 56/001 455/426.1 |
| 2015/0334760 A1* | 11/2015 | Sartori .................... H04L 43/08 370/329 |
| 2016/0095131 A1* | 3/2016 | Seo .................. H04W 72/0413 370/329 |
| 2016/0242152 A1* | 8/2016 | Yu .................. H04W 76/14 |
| 2016/0255615 A1* | 9/2016 | Chatterjee ............ H04W 76/18 370/330 |
| 2016/0309355 A1* | 10/2016 | Seo .................. H04W 8/005 |
| 2016/0338124 A1* | 11/2016 | Byun .................. H04W 76/00 |
| 2017/0027011 A1* | 1/2017 | Chae .................... H04W 52/10 |
| 2017/0070924 A1* | 3/2017 | Wu .................. H04W 76/23 |
| 2017/0188320 A1* | 6/2017 | Xiong .................. H04W 72/044 |
| 2017/0188375 A1* | 6/2017 | Seo .................. H04W 72/02 |

FOREIGN PATENT DOCUMENTS

| | | |
|---|---|---|
| CN | 103702346 A | 4/2014 |
| CN | 103843444 A | 6/2014 |
| WO | 2012015698 A1 | 2/2012 |
| WO | 2012159270 A1 | 11/2012 |

OTHER PUBLICATIONS

English Translation of the Written Opinion of the International Search Authority in international application No. PCT/CN2014/087467, dated Apr. 29, 2015, 13 pgs.
Supplementary European Search Report in European application No. 14899240.7, dated Jul. 27, 2017, 8 pgs.
European Office Action for corresponding application 14 899 240.7; Report dated Oct. 23, 2020.
ZTE: "Resource allocation for D2D Communication", 3GPP Draft' R2-140693 Resource Allocation for D2D Communication, 3rd Generation Partnership Project (3GPP) vol. RAN WG2, No. Prague Czech, Feb. 10, 2014-Feb. 14, 2014, Feb. 9, 2014, XP050791993.
Chinese Office Action for corresponding application 2014103916541; dated Jun. 19, 2019.
Chinese Office Action for corresponding application 2014103916541; dated Mar. 19, 2020.
Chinese Search Report for corresponding application 2014103916541; dated Jun. 19, 2019.
Notice of Rejection for corresponding application 2014103916541; dated Jun. 24, 2020.

* cited by examiner

METHOD, EQUIPMENT AND STORAGE MEDIUM FOR DEVICE TO DEVICE (D2D) RESOURCE POOL MEASUREMENT AND REPORTING

TECHNICAL FIELD

The disclosure relates to measurement and reporting technology for wireless communication, and particularly to a method, equipment and storage medium for Device to Device (D2D) resource pool measurement and reporting.

BACKGROUND

Along with development of wireless multimedia services, requirements on high data rate and user experience increasingly grow, so that higher requirements on system capacity and coverage of the conventional cellular network are proposed. Requirements on knowing about and communicating with interested persons or things nearby also gradually increase along with prevailing of applications such as a social network, short-distance data sharing and local advertising. The conventional cell-based cellular network has obvious limitations in terms of supporting high data rate and Proximity Service (ProSe), and under such a requirement background, the D2D technology representative of the future communication development direction emerges. Application of D2D technology may reduce burden of the cellular network, reduce battery power consumption of User Equipment (UE), increase data rate, improve robustness of a network infrastructure, and well meet requirements on the abovementioned high-data rate service and ProSe.

D2D technology usually includes D2D discovery technology and D2D communication technology. Before D2D discovery or D2D communication, D2D UE is required to acquire a corresponding radio resource at first. Two resource allocation manners may be adopted for both the D2D discovery resource and the D2D communication resource. The first resource allocation manner is competition-based resource acquisition, and the second resource allocation manner is allocation of specialized resource to UE by an Evolved Node B (eNodeB).

Specifically, the first resource allocation manner is usually that an eNodeB or a system pre-allocates a D2D resource pool. D2D UE participating in D2D discovery or D2D communication monitors the resource pool and acquires a D2D sending resource in a competition manner. The first resource allocation manner is mainly used for D2D UEs outside coverage of the cellular network, and may also be used for D2D UEs within the coverage of the cellular network. The D2D UE within the coverage of the cellular network uses a D2D completion resource pool configured by the serving cell, and the D2D UE outside the coverage of the cellular network uses a pre-configured D2D competition resource pool. The second resource allocation manner is that the eNodeB allocates a proper D2D resource to D2D UE according to a request of the D2D UE, and the second resource allocation manner is only applicable to the D2D UE within the coverage of the cellular network.

During D2D discovery or D2D communication, the network side is required to maintain the D2D competition resource pool for the competition-based resource acquisition manner, and the completion resource pool is used for D2D UEs in a specific range for resource competition. However, in a conventional art, the network side may not learn about the practical use condition of the D2D competition resource pool, thereby causing the problems of relatively higher D2D resource competition failure rate, relatively lower radio resource utilization rate, radio resource waste and the like.

SUMMARY

In view of this, an embodiment of the disclosure is intended to provide a method, equipment, and storage medium for implementing D2D resource pool measurement and reporting, which may enable the network side to learn about the practical use condition of the D2D competition resource pool and thus increase radio resource utilization rate.

The technical solutions of the embodiment of the disclosure are implemented as follows.

The embodiment of the disclosure provides a method for D2D resource pool measurement and reporting, which may include that: UE measures a D2D resource pool; and measurement information of the D2D resource pool is sent.

In an embodiment, before the step that the UE measures the D2D resource pool, the method may further include that: the UE receives measurement configuration information of the D2D resource pool.

In an embodiment, the step that the UE measures the D2D resource pool may include that: the UE measures the D2D resource pool according to the measurement configuration information of the D2D resource pool; or, the UE measures the D2D resource pool according to a predefined rule.

In an embodiment, the steps that the D2D resource pool is measured and the measurement information of the D2D resource pool is sent may include that: the UE measures the D2D resource pool in a Radio Resource Control (RRC) connected state, and/or an RRC IDLE state and/or a cellular network uncovered state, and sends the measurement information of the D2D resource pool to an eNodeB in the RRC connected state; or, the UE measures the D2D resource pool in the RRC connected state, and when a reporting condition is met, sends the measurement information of the D2D resource pool to the eNodeB.

In an embodiment, the step that the UE sends the measurement information of the D2D resource pool may include that: the UE sends log measurement available indication information to the eNodeB, receives log reporting request information sent by the eNodeB, and then sends the measurement information of the D2D resource pool to the eNodeB through a UE information response message; or, the UE sends the measurement information of the D2D resource pool to the eNodeB through a measurement report message.

In an embodiment, the step that the UE sends the log measurement available indication information to the eNodeB may include that: the UE sends the log measurement available indication information to the eNodeB through an RRC connection establishment completion message, or an RRC reestablishment completion message or an RRC reconfiguration completion message; and/or, the step that the log reporting request information sent by the eNodeB is received may include that: the UE receives the log reporting request information sent by the eNodeB through a UE information request message.

In an embodiment, the measurement information of the D2D resource pool may include: any one or more of D2D resource pool load information, D2D resource pool competition information, D2D resource pool indication information, serving cell information at a recording moment, registration Public Land Mobile Network (PLMN) or serving PLMN information, home PLMN or PLMN list information of the D2D resource pool, measured value of Reference Signal Receiving Power (RSRP) and/or Reference Signal Receiving Quality (RSRQ) of a serving cell and/or a neighbour cell, position information and time information.

In an embodiment, the D2D resource pool load information may include: any one or more of occupation proportion information of a time domain and/or frequency domain of the D2D resource pool, and/or a Physical Resource Block (PRB), and/or a D2D discovery resource unit and/or a D2D Scheduling Assignment (SA) resource element, average D2D resource pool receiving power information, detection success rate information and information of a time domain and/or frequency domain of an occupied resource in the D2D resource pool, and/or the PRB, and/or the D2D discovery resource unit and/or the D2D communication SA resource unit; and/or, the D2D resource pool competition information may include: any one or more of the D2D resource competition failure number, a D2D resource competition failure rate or success rate and a D2D resource acquisition time value; and/or, the D2D resource pool indication information may include: any one or more of D2D discovery resource pool indication information, D2D communication resource pool indication information, D2D communication SA resource pool indication information, D2D communication data resource pool indication information and time domain and/or frequency domain information of the measured resource pool.

In an embodiment, the log measurement available indication information may include: any one or more of a log measurement available indication, D2D type indication information and the time domain and/or frequency domain information of the measured D2D resource pool; and/or, the log reporting request information may include: any one or more of the log measurement available indication, the D2D type indication information and the time domain and/or frequency domain information of the measured D2D resource pool.

In an embodiment, the measurement configuration information of the D2D measurement pool may include: any one or more of measurement and reporting indication information, a measurement and reporting type, measurement area coverage information, content information for measurement and reporting, a reporting triggering condition type, information of a reporting triggering event, a reporting interval, the reporting number, a log recording interval, a log recording duration, a measurement permitted PLMN list, the D2D resource pool indication information, a UE state and a UE type.

In an embodiment, the measurement and reporting type may include: an immediate manner or a log manner; and/or, the measurement area coverage information may include: a cell identifier list, or a Tracking Area Code (TAC) list or a Tracking Area Identity (TAI) list; and/or, the reporting triggering condition type may include: event-triggered reporting, or periodic reporting or event-triggered periodic reporting; and/or, the UE type may include: a D2D discovery sending party, a D2D discovery receiving party, a D2D communication sending party, a D2D communication receiving party, D2D receiving UE and D2D UE; and/or, the content information for measurement and reporting may include: D2D resource pool measurement, the D2D resource pool load information and the D2D resource pool competition information; and/or, the information of the reporting triggering event may include: any one or more of a threshold value of an occupation proportion of the time domain of the D2D resource pool, and/or the frequency domain of the D2D resource pool, and/or the PRB, and/or the D2D discovery resource unit and/or the D2D communication SA resource unit, a D2D resource pool receiving power threshold value, a threshold value for detecting success rate or failure rate, a threshold value for D2D resource competition failure number, a threshold value for D2D resource competition failure rate and a threshold value for D2D resource acquisition time; and/or, the D2D resource pool indication information may include: any one or more of the D2D discovery resource pool indication information, the D2D communication resource pool indication information, the D2D communication SA resource pool indication information, the D2D communication data resource pool indication information and the time domain and/or frequency domain information of the resource pool to be measured.

The embodiment of the disclosure also provides a method for D2D resource pool measurement and reporting, which may include that: an eNodeB sends measurement configuration information of a D2D resource pool, the measurement configuration information of the D2D resource pool being configured for D2D UE to measure the D2D resource pool; and measurement information of the D2D resource pool is received.

In an embodiment, before the step that the eNodeB sends the measurement configuration information of the D2D resource pool, the method may further include that: the eNodeB receives the measurement configuration information of the D2D resource pool; and/or, D2D resource pool measurement capability information or Minimization of Drive Test (MDT) capability information of the D2D UE is acquired.

In an embodiment, the step that the eNodeB receives the measurement configuration information of the D2D resource pool may include that:

the eNodeB receives the measurement configuration information, sent by a Mobility Management Entity (MME), of the D2D resource pool through an S1 interface message; or, the eNodeB receives the measurement configuration information, sent by a neighbour eNodeB, of the D2D resource pool through an X2 interface message; or, the eNodeB receives the measurement configuration information, sent by an Operation And Maintenance (OAM) system, of the D2D resource pool.

In an embodiment, the step that the eNodeB sends the measurement configuration information of the D2D resource pool may include that:

the eNodeB sends the measurement configuration information of the D2D resource pool to the D2D UE through air interface dedicated signaling; or, the eNodeB sends the measurement configuration information of the D2D resource pool to the D2D UE through a broadcast message.

In an embodiment, after the step that the eNodeB receives the measurement information of the D2D resource pool, the method may further include that: the eNodeB executes D2D resource pool configuration optimization according to the received measurement information of the D2D resource pool; or, the eNodeB sends the received measurement information of the D2D resource pool to a Trace Collection Entity (TCE) or a D2D management network element, the measurement information of the D2D resource pool being configured for the TCE or the D2D management network element to execute D2D resource pool configuration optimization.

The embodiment of the disclosure also provides UE, which may include: a measurement module and a first sending module, the measurement module may be configured to measure a D2D resource pool; and the first sending module may be configured to send measurement information of the D2D resource pool.

In an embodiment, the UE may further include: a first receiving module, configured to receive measurement configuration information of the D2D resource pool.

In an embodiment, the measurement module may specifically be configured to measure the D2D resource pool according to the measurement configuration information of the D2D resource pool; or, measure the D2D resource pool according to a predefined rule.

In an embodiment, the measurement module may specifically be configured to measure the D2D resource pool when the UE is in an RRC connected state, and/or an RRC IDLE state and/or a cellular network uncovered state, and correspondingly, the first sending module may specifically be configured to send the measurement information of the D2D resource pool to an eNodeB when the UE is in the RRC connected state; or, the measurement module may specifically be configured to measure the D2D resource pool when the UE is in the RRC connected state, and correspondingly, the first sending module may be configured to, when a reporting condition is met, send the measurement information of the D2D resource pool to the eNodeB.

In an embodiment, the first sending module may specifically be configured to send log measurement available indication information to the eNodeB, receive log reporting request information sent by the eNodeB, and send the measurement information of the D2D resource pool to the eNodeB through a UE information response message; or, the first sending module may specifically be configured to send the measurement information of the D2D resource pool to the eNodeB through a measurement report message.

In an embodiment, the first sending module may send the log measurement available indication information to the eNodeB through an RRC connection establishment completion message, or an RRC reestablishment completion message or an RRC reconfiguration completion message; and/or, receiving the log reporting request information, by the first sending module, sent by the eNodeB may include that: the first sending module receives the log reporting request information sent by the eNodeB through a UE information request message.

The embodiment of the disclosure also provides an eNodeB, which may include: a second sending module and a second receiving module, the second sending module may be configured to send measurement configuration information of a D2D resource pool, the measurement configuration information of the D2D resource pool being configured for D2D UE to measure the D2D resource pool; and the second receiving module may be configured to receive measurement information of the D2D resource pool.

In an embodiment, the second receiving module may further be configured to receive the measurement configuration information of the D2D resource pool; and correspondingly, the eNodeB may further include: an acquisition module, configured to acquire D2D resource pool measurement capability information or MDT capability information of the D2D UE according to the measurement configuration information, received by the second receiving module, of the D2D resource pool.

In an embodiment, the second receiving module may specifically be configured to receive the measurement configuration information, sent by an MME, of the D2D resource pool through an S1 interface message; or, receive the measurement configuration information, sent by a neighbour eNodeB, of the D2D resource pool through an X2 interface message; or, receive the measurement configuration information, sent by an OAM system, of the D2D resource pool.

In an embodiment, the second sending module may specifically be configured to send the measurement configuration information of the D2D resource pool to the D2D UE through air interface dedicated signaling; or, send the measurement configuration information of the D2D resource pool to the D2D UE through a broadcast message.

In an embodiment, the eNodeB may further include: a configuration optimization module, configured to execute D2D resource pool configuration optimization according to the received measurement information of the D2D resource pool; or, send the received measurement information of the D2D resource pool to a TCE or a D2D management network element, the measurement information of the D2D resource pool being configured for the TCE or the D2D management network element to execute D2D resource pool configuration optimization.

The embodiment of the disclosure also provides a computer storage medium, in which a computer-executable instruction may be stored, the computer-executable instruction being configured to execute the method for D2D resource pool measurement and reporting of the embodiment of the disclosure.

According to the method for D2D resource pool measurement and reporting, equipment and storage medium provided by the embodiment of the disclosure, the UE measures the D2D resource pool according to the predefined rule, and sends the measurement information of the D2D resource pool to the eNodeB, and the eNodeB receives the measurement information of the D2D resource pool; or, the eNodeB may send the measurement configuration information of the D2D resource pool to the D2D UE with a measurement capability, the UE receives the measurement configuration information, sent by the eNodeB, of the D2D resource pool, measures the D2D resource pool according to the measurement configuration information of the D2D resource pool, and sends the measurement information of the D2D resource pool to the eNodeB, and the eNodeB receives the measurement information of the D2D resource pool. Therefore, the eNodeB may learn about a practical using condition of a configured D2D competition resource pool, and the eNodeB may optimize a configuration of the D2D competition resource pool according to the practical using condition of the D2D competition resource pool to avoid radio resource waste, increase a D2D resource competition success rate and a radio resource utilization rate and improve user experiences of a D2D service.

DETAILED DESCRIPTION

In the embodiment of the disclosure, a UE measures a D2D resource pool, and sends measurement information of the D2D resource pool to an eNodeB; and the eNodeB receives the measurement information of the D2D resource pool.

Figure 1:
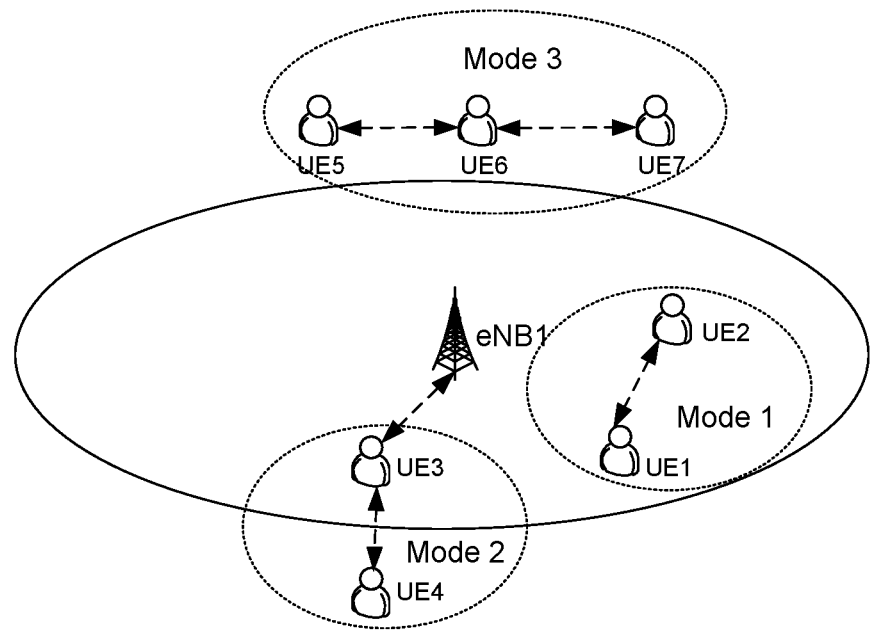
FIG. 1 is a schematic diagram of application modes of a D2D technology.

In order to make the technical solutions of the embodiment better understood, related knowledge about the D2D technology and the Minimization of Drive Test (MDT) will be simply introduced below. The D2D technology may work in an authorized frequency band or an unauthorized frequency band, and allows UEs supporting a D2D function, i.e. D2D UE performs direct discovery/direct communication with a network infrastructure or without a network infrastructure. As shown in FIG. 1, there are mainly three D2D application modes of the D2D technology as follows:

1) mode 1 shown in FIG. 1: UE1 and UE2 perform data interaction under coverage of a cellular network, and user plane data does not pass through a network infrastructure;

2) mode 2 shown in FIG. 1: UE in a weakly-covered or uncovered area performs relay transmission, and UE4 with poorer signal quality is allowed to communicate with the network through UE3 covered by the network nearby, which helps an operating company extend coverage and improve capacity; and 3) mode 3 shown in FIG. 1: direct communication among equipment is allowed under the condition that the cellular network may not work normally in case of an earthquake or emergency, and the control plane and the user plane among UE5, UE6 and UE7 may perform one-hop or multi-hop data communication without passing through any network infrastructure.

In order to reduce cost and complexity in manual drive test of an operating company with special equipment, the Third Generation Partnership Projects (3GPP) organization starts introducing an MDT function into Universal Terrestrial Radio Access Network (UTRAN) and Release-10 of Evolved Universal Terrestrial Radio Access Network (E-UTRAN).

An MDT function automatically collects measurement information, and reports it to a Radio Access Network (RAN) through control plane signaling by virtue of UE, and then reports it to a TCE of an OAM system through the RAN. Applications of MDT mainly include: coverage optimization, capacity optimization, mobility optimization, public channel parameter optimization and the like.

According to different MDT configuration manners, an existing MDT technology supports management-based MDT and signalling-based MDT flows. Management-based MDT is mainly for UE within specific area coverage, and in the flow, MDT configuration information is transmitted to an eNodeB through an OAM system, and the eNodeB selects proper UE by combining an MDT willing of the UE according to area information in the MDT configuration information, and transmits an MDT configuration to the UE. While signalling-based MDT mainly performs MDT configuration for specific UE, and in the flow, the eNodeB acquires MDT configuration information from an MME, and sends it to the UE. According to different UE reporting manners, an existing MDT technology supports immediate MDT and log MDT manners. The immediate MDT manner is mainly used for UE in a connected state, and in the immediate MDT manner, the UE may immediately report MDT information to a network side after a reporting condition is met. While the log MDT manner is mainly used for UE in an IDLE state, and the UE in the IDLE state performs MDT measurement, records and stores measurement information, and reports it to a network side at a proper time after subsequently entering a connected state.

Figure 2:
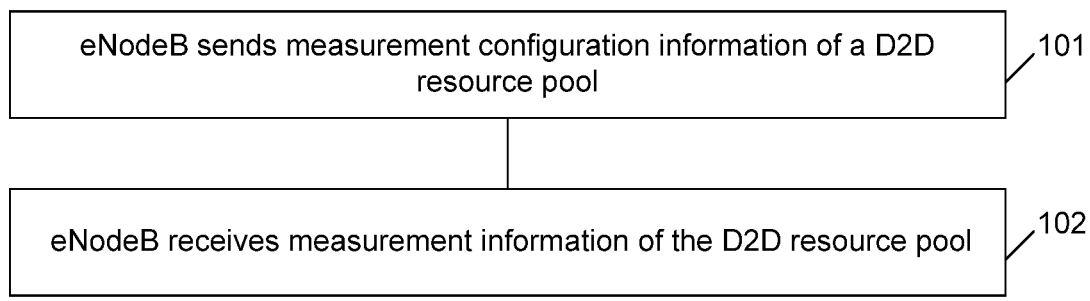
FIG. 2 is a basic processing flowchart of a method for D2D resource pool measurement and reporting for an eNodeB side according to an embodiment of the disclosure.

A basic processing flow of a method for D2D resource pool measurement and reporting for an eNodeB side in the embodiment of the disclosure, as shown in FIG. 2, includes the following steps.

Step 101: an eNodeB sends measurement configuration information of a D2D resource pool.

Specifically, the eNodeB sends the measurement configuration information of the D2D resource pool to D2D UE through air interface dedicated signalling; or, the eNodeB sends the measurement configuration information of the D2D resource pool to the D2D UE through a broadcast message; and the measurement configuration information of the D2D resource pool is configured for the D2D UE to measure the D2D resource pool.

The air interface dedicated signalling includes: RRC reconfiguration message, log measurement configuration message and the like.

The measurement configuration information of the D2D resource pool includes: any one or more of measurement and reporting indication information, a measurement and reporting type, measurement area coverage information, content information for measurement and reporting, a reporting triggering condition type, information of a reporting triggering event, a reporting interval, the reporting number, a log recording interval, a log recording duration, a measurement permitted PLMN list, the D2D resource pool indication information, a UE state and a UE type.

The measurement and reporting type includes: an immediate manner or a log manner;

the measurement area coverage information includes: a cell identifier list, or a TAC list or a TAI list;

the reporting triggering condition type includes: event-triggered reporting, or periodic reporting or event-triggered periodic reporting;

the UE state includes: an RRC connected state, and/or an RRC IDLE state and/or a cellular network uncovered state;

the UE type includes: a D2D discovery sending party, a D2D discovery receiving party, a D2D communication sending party, a D2D communication receiving party, D2D receiving UE and D2D UE;

the content information for measurement and reporting includes: D2D resource pool measurement, D2D resource pool load information and D2D resource pool competition information;

the information of the reporting triggering event includes: any one or more of a threshold value of an occupation proportion of a time domain of the D2D resource pool, and/or a frequency domain of the D2D resource pool, and/or a PRB, and/or a D2D discovery resource unit and/or a D2D communication SA resource unit, a D2D resource pool receiving power threshold value, a threshold value for detecting success rate or failure rate, a threshold value for D2D resource competition failure number, a threshold value for D2D resource competition failure rate and a threshold value for D2D resource acquisition time;

here, when a competition-based resource acquisition manner is adopted, whether D2D resource competition succeeds or not is determined according to whether signal receiving power is higher than the preset threshold value or not, it is determined that D2D resource competition succeeds when the receiving power is higher than the preset threshold value, otherwise it is determined that D2D resource competition fails; and the D2D resource pool indication information includes: any one or more of D2D discovery resource pool indication information, D2D communication resource pool indication information, D2D communication SA resource pool indication information, D2D communication data resource pool indication information and time domain and/or frequency domain information of the resource pool to be measured.

Step 102: the eNodeB receives measurement information of the D2D resource pool. Specifically, the eNodeB receives the measurement information, sent by the D2D UE, of the D2D resource pool.

Before Step 101 is executed, the method further includes:

Step 100: the eNodeB receives the measurement configuration information of the D2D resource pool, and acquires D2D resource pool measurement capability information or MDT capability information of the D2D UE.

Specifically, the eNodeB receives the measurement configuration information, sent by an MME, of the D2D resource pool through an S1 interface message; or, the eNodeB receives the measurement configuration information, sent by a neighbour eNodeB, of the D2D resource pool through an X2 interface message; or, the eNodeB receives the measurement configuration information, sent by an OAM system, of the D2D resource pool, The S1 interface message includes: a UE initial context establishment request message, a UE context modification request message, S1 handover request message and trace starting message; and the X2 interface message includes X2 handover request message.

After Step 102 is executed, the method further includes:

Step 103: the eNodeB executes D2D resource pool configuration optimization according to the received measurement information of the D2D resource pool; or, the eNodeB sends the received measurement information of the D2D resource pool to a TCE or a D2D management network element, the measurement information of the D2D resource pool being configured for the TCE or the D2D management network element to execute D2D resource pool configuration optimization.

Figure 3:
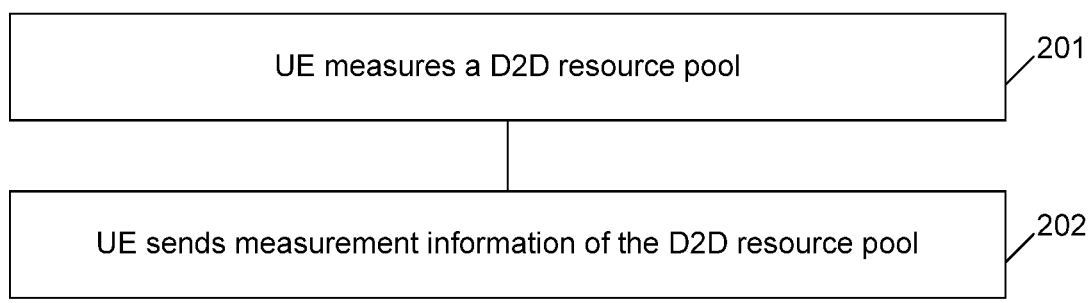
FIG. 3 is a basic processing flowchart of a method for D2D resource pool measurement and reporting for a UE side according to an embodiment of the disclosure.

A basic processing flow of a method for D2D resource pool measurement and reporting for a UE side in the embodiment of the disclosure, as shown in FIG. 3, includes the following steps.

Step 201: UE measures a D2D resource pool.

Specifically, the UE measures the D2D resource pool in an RRC connected state, and/or an RRC IDLE state and/or a cellular network uncovered state, and sends the measurement information of the D2D resource pool to an eNodeB in the RRC connected state; or, the UE measures the D2D resource pool in the RRC connected state, and when a reporting condition is met, sends the measurement information of the D2D resource pool to the eNodeB, the reporting condition includes: conditions of event-triggered reporting, or periodic reporting, or event-triggered periodic reporting.

Here, the UE measures the D2D resource pool according to a predefined rule when not receiving measurement configuration information of the D2D resource pool; and the UE measures the D2D resource pool according to the measurement configuration information of the D2D resource pool after receiving the measurement configuration information of the D2D resource pool, the predefined rule is default configuration information in the UE.

Step 202: the UE sends measurement information of the D2D resource pool.

Specifically, the UE sends log measurement available indication information to the eNodeB through an RRC connection establishment completion message, or an RRC reestablishment completion message or an RRC reconfiguration completion message, and receives log reporting request information sent by the eNodeB through a UE information request message, and the UE sends the measurement information of the D2D resource pool to the eNodeB through a UE information response message; or, the UE sends the measurement information of the D2D resource pool to the eNodeB through a measurement report message.

Here, the log measurement available indication information includes: any one or more of a log measurement available indication, D2D type indication information and time domain and/or frequency domain information of the measured D2D resource pool; and the D2D type indication information includes: D2D discovery and D2D communication.

The log reporting request information includes: any one or more of the log measurement available indication, the D2D type indication information and the time domain and/or frequency domain information of the measured D2D resource pool; and the D2D type indication information includes: D2D discovery and D2D communication.

The measurement information of the D2D resource pool includes: any one or more of D2D resource pool load information, D2D resource pool competition information, D2D resource pool indication information, serving cell information at a recording moment, registration PLMN or serving PLMN information, home PLMN or PLMN list information of the D2D resource pool, (an) RSRP and/or RSRQ measured value(s) of a serving cell and/or a neighbour cell, position information and time information.

The D2D resource pool load information includes: any one or more of occupation proportion information of a time domain and/or frequency domain of the D2D resource pool, and/or a PRB, and/or a D2D discovery resource unit and/or a D2D SA resource element, average D2D resource pool receiving power information, detection success rate information and information of a time domain and/or frequency domain of an occupied resource in the D2D resource pool, and/or the PRB, and/or the D2D discovery resource unit and/or the D2D communication SA resource unit.

Average D2D resource pool receiving power is average receiving power of D2D resources in the whole resource pool; the average D2D resource pool receiving power is the average receiving power of the D2D resources in the measured resource pool; the detection success rate is a rate of correct detection of a D2D discovery signal in a D2D resource of which signal receiving power exceeds a certain threshold value, for example: correct rate of Cyclic Redundancy Check (CRC); and the threshold value of the signal receiving power may be acquired in a manner of presetting or default or configured by the eNodeB.

The D2D resource pool competition information includes: any one or more of the D2D resource competition failure number, a D2D resource competition failure rate or success rate and a D2D resource acquisition time value; and a D2D resource acquisition time refers to a time from initiation of D2D resource competition to acquisition of an available resource.

The D2D resource pool indication information includes: any one or more of D2D discovery resource pool indication information, D2D communication resource pool indication information, D2D communication SA resource pool indication information, D2D communication data resource pool indication information and time domain and/or frequency domain information of the measured resource pool; and the resource pool indication information may be 1-bit, and 2 values in 1 bit indicate that a D2D discovery resource pool and a D2D communication resource pool are measured respectively.

Before Step 201, the method may further include:

Step 200: the UE receives measurement configuration information of the D2D resource pool.

Specifically, the UE receives the measurement configuration information, sent by the eNodeB, of the D2D resource pool; and the measurement configuration information of the D2D resource pool includes: any one or more of measurement and reporting indication information, a measurement and reporting type, measurement area coverage information, content information for measurement and reporting, a reporting triggering condition type, information of a reporting triggering event, a reporting interval, the reporting number, a log recording interval, a log recording duration, a measurement permitted PLMN list, the D2D resource pool indication information, a UE state and a UE type.

The measurement and reporting type includes: an immediate manner or a log manner;

the measurement area coverage information includes: a cell identifier list, or a TAC list or a TAI list;

the reporting triggering condition type includes: event-triggered reporting, or periodic reporting or event-triggered periodic reporting;

the UE state includes: the RRC connected state, and/or the RRC IDLE state and/or the cellular network uncovered state;

the UE type includes: a D2D discovery sending party, a D2D discovery receiving party, a D2D communication sending party, a D2D communication receiving party, D2D receiving UE and D2D UE;

the content information for measurement and reporting includes: D2D resource pool measurement, the D2D resource pool load information and the D2D resource pool competition information;

the information of the reporting triggering event includes: any one or more of a threshold value of an occupation proportion of the time domain of the D2D resource pool, and/or the frequency domain of the D2D resource pool, and/or the PRB, and/or the D2D discovery resource unit and/or the D2D communication SA resource unit, a D2D resource pool receiving power threshold value, a threshold value for detecting success rate or failure rate, a threshold value for D2D resource competition failure number, a threshold value for D2D resource competition failure rate and a threshold value for D2D resource acquisition time;

here, when a competition-based resource acquisition manner is adopted, whether D2D resource competition succeeds or not is determined according to whether signal receiving power is higher than the preset threshold value or not, it is determined that D2D resource competition succeeds when the receiving power is higher than the preset threshold value, otherwise it is determined that D2D resource competition fails; and the D2D resource pool indication information includes: any one or more of the D2D discovery resource pool indication information, the D2D communication resource pool indication information, the D2D communication SA resource pool indication information, the D2D communication data resource pool indication information and the time domain and/or frequency domain information of the resource pool to be measured.

Embodiment 1

Figure 4:
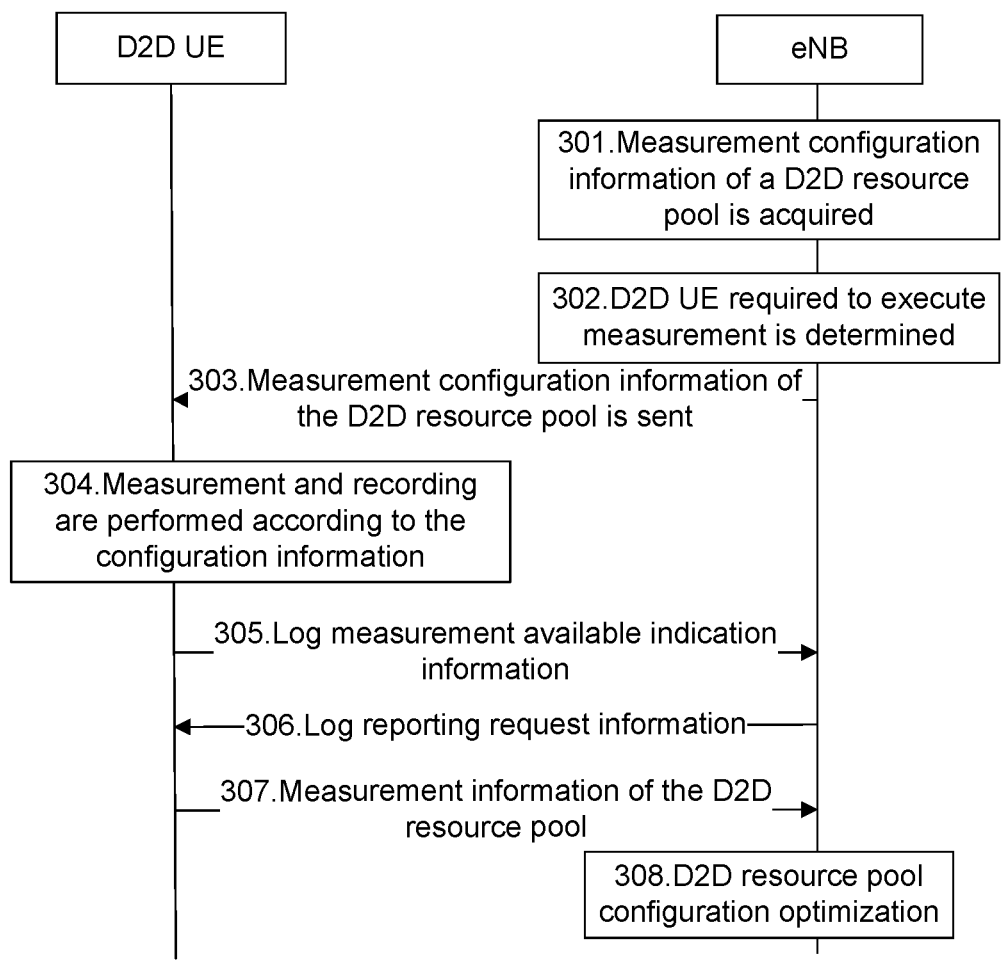
FIG. 4 is a detailed processing flowchart of a method for D2D resource pool measurement and reporting for a UE side according to embodiment 1 of the disclosure.

An eNodeB configures for the UE, the log measurement and measurement and reporting through RRC dedicated signalling. A detailed processing flow of a method for D2D resource pool measurement and reporting in embodiment 1 of the disclosure, as shown in FIG. 4, includes the following steps.

Step 301: an eNodeB acquires measurement configuration information of a D2D resource pool.

Specifically, the eNodeB may receive the measurement configuration information, sent by an MME, of the D2D resource pool through an S1 interface initial context establishment request message, or a UE context modification request message, or an S1 handover request message, or a trace starting message or the like; or, the eNodeB receives the measurement configuration information, sent by a neighbour eNodeB, of the D2D resource pool through an X2 handover request message; or, the eNodeB receives the measurement configuration information, sent by an OAM system, of the D2D resource pool; or, the eNodeB autonomously determines the measurement configuration information of the D2D resource pool.

The measurement configuration information of the D2D resource pool includes any one or more of the following 1) to 6):

1) content information for measurement and reporting, configured to indicate that D2D resource pool measurement is configured, the content information for measurement and reporting including: resource pool load information and resource pool competition information;

2) D2D resource pool indication information, configured to indicate information of the D2D resource pool to be measured, the D2D resource pool indication information including: D2D discovery resource pool indication information, D2D communication resource pool indication information, D2D communication SA resource pool indication information, D2D communication data resource pool indication information and time domain and/or frequency domain information of the resource pool to be measured;

3) measurement area coverage information, configured to indicate area coverage to be measured, the measurement area coverage information including: a cell identifier list, or a TAC list, or a TAI list;

4) a measurement permitted PLMN list, configured to indicate information of a PLMN required to execute measurement, recording and reporting;

5) a UE state, configured to indicate a state in which UE is required to execute configured measurement, the UE state including: an RRC connected state, and/or an RRC IDLE state and/or a cellular network uncovered state; and 6) a log recording interval and a log recording duration.

Step 302: the eNodeB determines D2D UE required to execute measurement.

Specifically, the eNodeB determines the D2D UE required to be configured to execute measurement and a content required to be measured and reported according to the D2D resource pool to be measured; and the eNodeB may determine the D2D UE required to execute measurement in the following manner.

1) When the D2D resource pool to be measured is a D2D discovery resource pool, a UE sending party randomly selects a resource for sending during D2D discovery, and does not monitor the resource pool before sending, so that the eNodeB may preferably select receiving UE for D2D discovery to measure and report a load of the D2D resource pool to be measured when monitoring the D2D discovery resource pool, measurement of the load of the D2D resource pool includes: measurement of average D2D resource pool receiving power and a detection success rate.

Here, the average D2D resource pool receiving power is average receiving power of D2D resources in the measured resource pool; the detection success rate is rate of correct detection of a D2D discovery signal in a D2D resource of which signal receiving power exceeds a certain threshold value, for example: correct CRC; and the threshold value of the signal receiving power may be acquired in a manner of presetting or default or configured by the eNodeB.

2) When the D2D resource pool to be measured is a D2D communication resource pool, or a D2D communication SA resource pool or a D2D communication data resource pool and a resource selection manner that sending UE in D2D communication randomly selects a resource for sending and the UE does not monitor the resource pool before sending the resource is adopted, the eNodeB may preferably select the receiving UE for D2D communication to measure and report a load of the D2D resource pool to be measured when monitoring the D2D communication resource pool, measurement of the load of the D2D resource pool includes: measurement of average D2D resource pool receiving power and a detection success rate.

Here, the average D2D resource pool receiving power is average receiving power of D2D resources in the measured resource pool; the detection success rate is rate of correct detection of a D2D discovery signal in a D2D resource of which signal receiving power exceeds a certain threshold value, for example: correct CRC; and the threshold value of the signal receiving power may be acquired in a manner of presetting or default or configured by the eNodeB.

3) When the D2D resource pool to be measured is a D2D communication resource pool, or a D2D communication SA resource pool or a D2D communication data resource pool and a resource selection manner that the sending UE in D2D communication monitors the resource pool before sending and judges whether a corresponding resource may be selected for D2D sending or not according to a power threshold value which is preset or determined as a default or configured by the eNodeB is adopted, the eNodeB may preferably select the sending UE for D2D communication to report a competition condition of the D2D resource pool to be measured, the competition condition of the D2D resource pool includes: the D2D resource competition failure number, a D2D resource competition failure rate or success rate and a D2D resource acquisition time value; and for example: the UE measures that signal receiving power of the corresponding resource is lower than the receiving power threshold value, and the sending UE considers that the corresponding resource may be used for D2D sending, that is, resource competition succeeds.

Step 303: the eNodeB sends the measurement configuration information of the D2D resource pool to the D2D UE through RRC dedicated signalling.

The RRC dedicated signalling may be a log measurement configuration message, or an added RRC dedicated message.

Specifically, the eNodeB acquires D2D resource pool measurement or MDT measurement capability information of the D2D UE at first, and then sends the measurement configuration information of the D2D resource pool to the D2D UE.

Here, the eNodeB may determine whether to configure D2D resource pool measurement to proper UE or not according to a current using condition of cellular communication resources. For example, when a cellular communication load of the eNodeB is relatively heavier and the resources are strained, the UE is configured to perform D2D resource pool measurement and reporting to judge whether a part of D2D resources may be configured into cellular communication resources or not; and when the cellular communication load of the eNodeB is relatively lighter and the resources are relatively more abundant, the UE is configured to perform D2D resource pool measurement and reporting to judge whether it is necessary to configure a part of the cellular communication resources into D2D resources or not.

Step 304: the D2D UE performs measurement and recording according to the received measurement configuration information of the D2D resource pool.

Specifically, when the configuration information includes UE state information, the D2D UE measures the D2D resource pool according to the configured UE state; or, the D2D UE performs measurement in the RRC IDLE state, and/or the RRC connected state and/or the network uncovered state as a default; or, if the configuration information includes the measurement area coverage information, for UE covered by a cellular network, whether an area where it is currently located meets the configured area coverage or not is checked at first, and if the area where the UE is located is within the configured area coverage, D2D resource pool measurement is performed.

For example: the configuration information includes a measurement PLMN list, for the UE covered by the cellular network, whether a registration PLMN is in the configured measurement PLMN list or not is judged at first, and when the PLMN of the UE belongs to the list, the UE measures and records the D2D resource pool.

Step 305: the D2D UE is covered by a cellular network, and when the D2D UE enters or is located in an RRC connected state, the UE sends log measurement available indication information to the eNodeB through RRC dedicated signalling of RRC connection reconfiguration completion, RRC connection reestablishment completion, RRC establishment completion and the like.

The log measurement available indication information is configured to indicate that the UE has stored available log measurement information for reporting to the eNodeB.

Here, the log measurement available indication information includes: any one or more of a log measurement available indication, D2D type indication information and the time domain and/or frequency domain information of the measured D2D resource pool.

The D2D type indication information includes: D2D discovery and D2D communication.

Step 306: the eNodeB receives the log measurement available indication information, and sends log reporting request information to the D2D UE through RRC dedicated signalling such as a UE information request message.

The log reporting request information is configured to request for log measurement information reporting.

Here, the log reporting request information may include: any one or more of the log measurement available indication, the D2D type indication information and the time domain and/or frequency domain information of the measured D2D resource pool; and the D2D type indication information includes: D2D discovery and D2D communication.

Step 307: the D2D UE reports measurement information of the D2D resource pool to the eNodeB through RRC dedicated signalling such as a UE information response message.

The measurement information of the D2D resource pool includes any one or more of the following 1) to 7).

1) D2D resource pool load information

The D2D resource pool load information includes any one or more of the following ① to ③:

① occupation proportion information of a time domain and/or frequency domain of the D2D resource pool and/or a PRB, and/or a D2D discovery resource unit and/or a D2D SA resource element, and the occupation proportion information of the D2D communication SA resource unit may be represented in form of percentage or represented by low, middle and high levels;

② information of a time domain and/or frequency domain of an occupied resource in the D2D resource pool and/or the PRB, and/or the D2D discovery resource unit and/or the D2D communication SA resource unit; and ② D2D resource pool receiving power information, and the D2D resource pool receiving power information is average receiving power information of the measured D2D resource pool.

The detection success rate information is specifically that: when the UE monitors a D2D discovery or D2D communication SA resource pool, if signal receiving power of a D2D discovery or D2D communication SA resource exceeds a specific threshold value, the D2D UE preliminarily judges that there is neighbour D2D UE sending a D2D discovery signal or D2D communication SA information on the D2D discovery or D2D communication SA resource, thereby performing an operation of baseband processing, demodulation and decoding on the signal received on the corresponding resource; if the D2D discovery signal or the D2D communication SA information may be correctly detected, for example, in case of correct CRC, it is determined that detection succeeds once; that is: a detection success rate is a rate of correct detection of the D2D discovery signal or the D2D communication SA information in the D2D resource of which the signal receiving power is higher than a certain threshold value, and the threshold value of the signal receiving power may be acquired in a manner of presetting or default or configured by the eNodeB.

Here, the D2D resource pool load information is an average value within a certain time; and the specific threshold value may be a preset value, or a default value, or a value configured by the eNodeB.

2) D2D resource pool competition information

The D2D resource pool competition information includes: the D2D resource competition failure number, the D2D resource competition failure rate or success rate and the D2D resource acquisition time value.

Specifically, during D2D communication, the D2D UE monitors the resource pool before selecting a resource sending, and when receiving power of the corresponding resource is lower than a specific threshold value, the UE determines that the resource may be used for D2D sending, that is, resource competition succeeds, otherwise determines that resource competition fails; and if the UE does not detect any available D2D resource within a D2D resource period, it may be determined that D2D resource competition fails once. The D2D resource competition failure rate is a ratio of the D2D resource competition failure number in N D2D resource periods to a D2D resource period number N. The D2D resource acquisition time value is a time length from resource competition starting of the D2D UE to successful acquisition of an available competition resource.

3) The D2D resource pool indication information is configured to indicate information of the measured D2D resource pool, The D2D resource pool indication information includes: the D2D discovery resource pool indication information, the D2D communication resource pool indication information, the D2D communication SA resource pool indication information, the D2D communication data resource pool indication information and the time domain and/or frequency domain information of the measured resource pool.

4) Serving cell information includes: information such as an E-UTRAN Cell Global Identifier (ECGI) and a Physical Cell Identifier (PCI).

5) Registration PLMN or serving PLMN information, and/or home PLMN or PLMN list information of the D2D resource pool.

6) (An) RSRP and/or RSRQ measured value(s) of a serving cell and/or a neighbour cell.

7) Position information and time information at a measurement moment.

Step 308: the eNodeB performs D2D resource pool configuration optimization.

Specifically, after collecting resource pool measurement information of one or more pieces of D2D UE, the eNodeB may perform D2D resource pool configuration optimization according to the resource pool measurement information of the D2D UE.

The step that the eNodeB performs D2D resource pool configuration optimization according to the resource pool measurement information of the D2D UE includes that:

when the D2D resource pool is heavily loaded, for example: the occupation proportion of the time domain and/or frequency domain of the D2D resource pool, and/or the PRB, and/or the D2D discovery resource unit and/or the D2D communication SA resource unit is relatively higher or the receiving power of the resource pool is relatively higher and the detection success rate is relatively lower, the D2D resource pool may be expanded for more D2D UE to compete for;

when the D2D resource pool is lightly loaded, for example: the occupation proportion of the time domain and/or frequency domain of the D2D resource pool, and/or the PRB, and/or the D2D discovery resource unit and/or the D2D communication SA resource unit is relatively lower or the receiving power of the resource pool is relatively lower and the detection success rate is relatively higher, the D2D resource pool may be properly reduced to avoid radio resource waste; and when the D2D resource pool competition success rate is relatively lower, the D2D resource pool is expanded for more D2D UE to compete for, and when the D2D resource pool competition success rate is relatively higher, the D2D resource pool is properly reduced to avoid radio resource waste.

Furthermore, the eNodeB is required to send regulated D2D resource pool information to the D2D UE in a broadcast manner or an RRC dedicated signalling manner after performing D2D resource pool configuration optimization.

The eNodeB may also send the measurement information, received by itself, of the D2D resource pool to a TCE or a D2D management network element for the TCE or the D2D management network element to perform D2D resource pool configuration optimization.

Correspondingly, the TCE or the D2D management network element is also required to send regulated D2D resource pool information to the D2D UE after executing D2D resource pool configuration optimization.

Here, the D2D management network element may be a ProSe function or an added D2D management entity.

Embodiment 2

Figure 5:
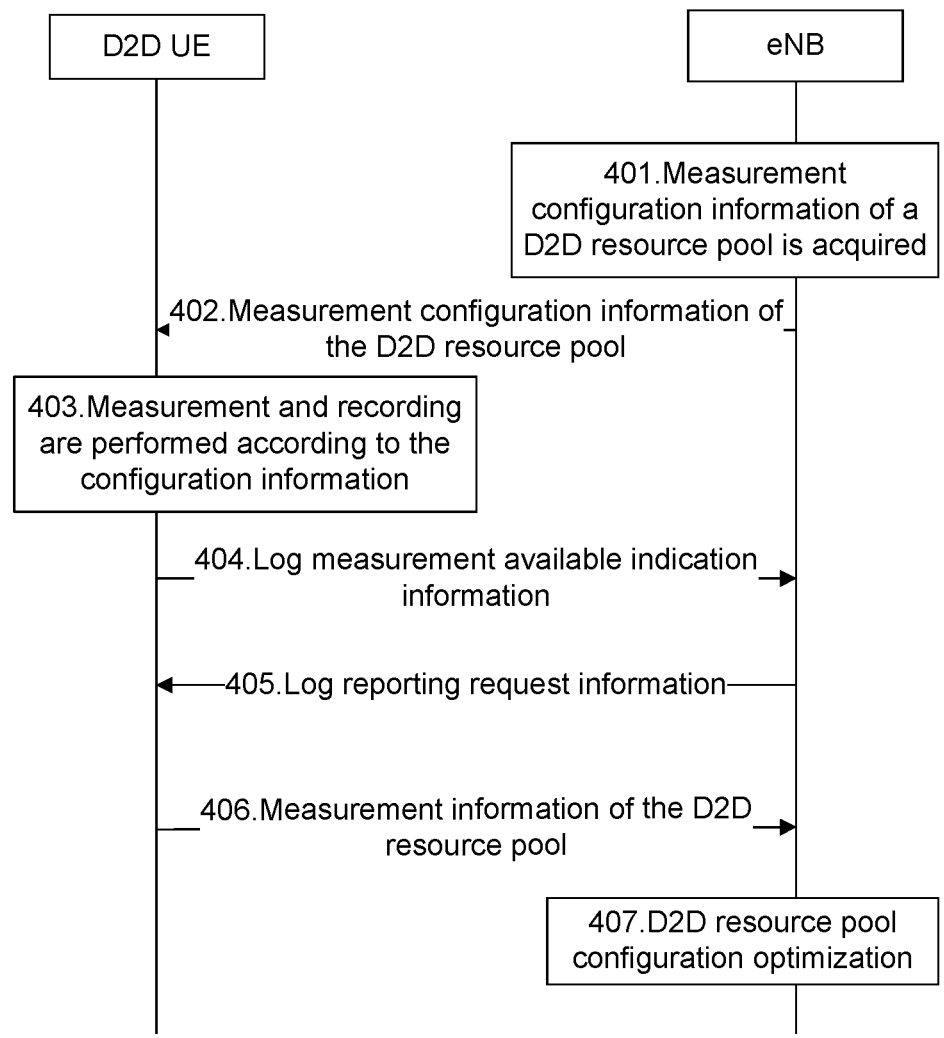
FIG. 5 is a detailed processing flowchart of a method for D2D resource pool measurement and reporting according to embodiment 2 of the disclosure.

An eNodeB configures log measurement and measurement reporting to UE through a system message. A detailed processing flow of a method for D2D resource pool measurement and reporting in embodiment 2 of the disclosure, as shown in FIG. 5, includes the following steps.

Step 401: an eNodeB acquires measurement configuration information of a D2D resource pool.

Specifically, the eNodeB may receive the measurement configuration information, sent by an MME, of the D2D resource pool through an S1 interface initial context establishment request message, or a UE context modification request message, or an S1 handover request message, or a trace starting message or the like; or, the eNodeB receives the measurement configuration information, sent by a neighbour eNodeB, of the D2D resource pool through an X2 handover request message; or, the eNodeB receives the measurement configuration information, sent by an OAM system, of the D2D resource pool; or, the eNodeB autonomously determines the measurement configuration information of the D2D resource pool.

The measurement configuration information of the D2D resource pool includes any one or more of the following 1) to 7):

1) content information for measurement and reporting, configured to indicate that D2D resource pool measurement is configured, the content information for measurement and reporting including: resource pool load information and resource pool competition information;

2) D2D resource pool indication information, configured to indicate information of the D2D resource pool to be measured, the D2D resource pool indication information including: D2D discovery resource pool indication information, D2D communication resource pool indication information, D2D communication SA resource pool indication information, D2D communication data resource pool indication information and time domain and/or frequency domain information of the resource pool to be measured;

3) measurement area coverage information, configured to indicate area coverage to be measured, the measurement area coverage information including: a cell identifier list, or a TAC list, or a TAI list;

4) a measurement permitted PLMN list, configured to indicate information of a PLMN required to execute measurement, recording and reporting;

5) a UE state, configured to indicate a state in which UE is required to execute configured measurement, the UE state including: an RRC connected state, and/or an RRC IDLE state and/or a cellular network uncovered state;

6) a UE type, configured to indicate a UE type required to be configured to execute measurement, the UE type including: D2D sending UE, D2D receiving UE, a D2D discovery sending party, a D2D discovery receiving party, a D2D communication sending party, a D2D communication receiving party and D2D UE; and 7) a log recording interval and a log recording duration.

Step 402: the eNodeB sends the measurement configuration information of the D2D resource pool to served D2D UE through a system message.

The system message is an existing system message, or an added D2D system message, such as System Information Block 18 (SIB18).

Specifically, the eNodeB acquires a D2D resource pool measurement capability or MDT measurement capability of the D2D UE at first, and then sends the measurement configuration information of the D2D resource pool to the D2D UE, that is: the eNodeB may judge whether to send the measurement configuration information to the D2D UE or not according to capability information of the D2D UE.

Here, when a cellular communication load of the eNodeB is relatively heavier and resources are strained, corresponding D2D resource pool measurement reporting is configured to judge whether a part of D2D resources may be configured into cellular communication resources or not; and when the cellular communication load of the eNodeB is relatively lighter and the resources are relatively more abundant, corresponding D2D resource pool measurement reporting is configured to judge whether it is necessary to configure a part of the cellular communication resources into D2D resources or not.

Step 403: the D2D UE performs measurement and recording according to the received measurement configuration information of the D2D resource pool.

Specifically, when the configuration information includes UE state information, the D2D UE measures the D2D resource pool according to the configured UE state; or, the D2D UE performs measurement in the RRC IDLE state, and/or the RRC connected state and/or the network uncovered state as a default; or, when the configuration information includes UE type information, UE of a type corresponding to the configured UE type information performs corresponding measurement on the D2D resource pool, and the UE which measures the D2D resource pool includes: any one or more of the D2D sending UE, the D2D receiving UE, the D2D discovery sending party, the D2D discovery receiving party, the D2D communication sending party, the D2D communication receiving party and the D2D UE; or, when the configuration information includes the measurement area coverage information, for UE covered by a cellular network, whether an area where it is currently located meets the configured area coverage or not is checked at first, and if the area where the UE is located is within the configured area coverage, D2D resource pool measurement is performed; or, when the configuration information includes a measurement PLMN list, for the UE covered by the cellular network, whether a registration PLMN is in the configured measurement PLMN list or not is judged at first, and when the PLMN of the UE belongs to the configured measurement PLMN list, the UE measures and records the D2D resource pool.

Step 404: the D2D UE is covered by a cellular network, and when the D2D UE enters or is located in an RRC connected state, the UE sends log measurement available indication information to the eNodeB through RRC dedicated signalling of RRC connection reconfiguration completion, RRC connection reestablishment completion, RRC establishment completion and the like.

The log measurement available indication information is configured to indicate that the UE has stored available log measurement information for reporting to the eNodeB.

Here, the log measurement available indication information includes: any one or more of a log measurement available indication, D2D type indication information and the time domain and/or frequency domain information of the measured D2D resource pool.

The D2D type indication information includes: D2D discovery and D2D communication.

Step 405: the eNodeB receives the log measurement available indication information, and sends log reporting request information to the D2D UE through RRC dedicated signalling such as a UE information request message.

The log reporting request information is configured to request for log measurement information reporting.

Here, the log reporting request information may include: any one or more of the log measurement available indication, the D2D type indication information and the time domain and/or frequency domain information of the measured D2D resource pool;

and the D2D type indication information includes: D2D discovery and D2D communication.

Step 406: the D2D UE reports measurement information of the D2D resource pool to the eNodeB through RRC dedicated signalling such as a UE information response message.

The measurement information of the D2D resource pool includes any one or more of the following 1) to 7).

1) D2D resource pool load information

The D2D resource pool load information includes any one or more of the following ① to ③:
- ① occupation proportion information of a time domain and/or frequency domain of the D2D resource pool and/or a PRB, and/or a D2D discovery resource unit and/or a D2D SA resource element, and the occupation proportion information of the D2D communication SA resource unit may be represented in form of percentage or represented by low, middle and high levels;
- ② information of a time domain and/or frequency domain of an occupied resource in the D2D resource pool and/or the PRB, and/or the D2D discovery resource unit and/or the D2D communication SA resource unit; and
- ② D2D resource pool receiving power information, and the D2D resource pool receiving power information is average receiving power information of the measured D2D resource pool.

The detection success rate information is specifically that: when the UE monitors a D2D discovery or D2D communication SA resource pool, if signal receiving power of a D2D discovery or D2D communication SA resource exceeds a specific threshold value, the D2D UE preliminarily judges that there is neighbour D2D UE sending a D2D discovery signal or D2D communication SA information on the D2D discovery or D2D communication SA resource, thereby performing an operation of baseband processing, demodulation and decoding on the signal received on the corresponding resource; if the D2D discovery signal or the D2D communication SA information may be correctly detected, for example, in case of correct CRC, it is determined that detection succeeds once; that is: a detection success rate is a rate of correct detection of the D2D discovery signal or the D2D communication SA information in the D2D resource of which the signal receiving power is higher than a certain threshold value, and the threshold value of the signal receiving power may be acquired in a manner of presetting or default or configured by the eNodeB.

Here, the D2D resource pool load information is an average value within a certain time; and the specific threshold value may be a preset value, or a default value, or a value configured by the eNodeB.

2) D2D resource pool competition information

The D2D resource pool competition information includes: the D2D resource competition failure number, a D2D resource competition failure rate or success rate and a D2D resource acquisition time value.

Specifically, during D2D communication, the D2D UE monitors the resource pool before selecting a resource sending, and when receiving power of the corresponding resource is lower than a specific threshold value, the UE determines that the resource may be used for D2D sending, that is, resource competition succeeds, otherwise determines that resource competition fails; and if the UE does not detect any available D2D resource within a D2D resource period, it may be determined that D2D resource competition fails once. The D2D resource competition failure rate is a ratio of the D2D resource competition failure number in N D2D resource periods to a D2D resource period number N. The D2D resource acquisition time value is a time length from resource competition starting of the D2D UE to successful acquisition of an available competition resource.

3) The D2D resource pool indication information is configured to indicate information of the measured D2D resource pool, the D2D resource pool indication information includes: the D2D discovery resource pool indication information, the D2D communication resource pool indication information, the D2D communication SA resource pool indication information, the D2D communication data resource pool indication information and the time domain and/or frequency domain information of the measured resource pool.

4) Serving cell information includes: information such as an ECGI and a PCI.

5) Registration PLMN or serving PLMN information, and/or home PLMN or PLMN list information of the D2D resource pool.

6) (An) RSRP and/or RSRQ measured value(s) of a serving cell and/or a neighbour cell.

7) Position information and time information at a measurement moment.

Step 407: the eNodeB performs D2D resource pool configuration optimization.

Specifically, after collecting resource pool measurement information of one or more pieces of D2D UE, the eNodeB may perform D2D resource pool configuration optimization according to the resource pool measurement information of the D2D UE.

The step that the eNodeB performs D2D resource pool configuration optimization according to the resource pool measurement information of the D2D UE includes that:

when the D2D resource pool is heavily loaded, for example: the occupation proportion of the time domain and/or frequency domain of the D2D resource pool, and/or the PRB, and/or the D2D discovery resource unit and/or the D2D communication SA resource unit is relatively higher or the receiving power of the resource pool is relatively higher and the detection success rate is relatively lower, the D2D resource pool may be expanded for more D2D UE to compete for;

when the D2D resource pool is lightly loaded, for example: the occupation proportion of the time domain and/or frequency domain of the D2D resource pool, and/or the PRB, and/or the D2D discovery resource unit and/or the D2D communication SA resource unit is relatively lower or the receiving power of the resource pool is relatively lower and the detection success rate is relatively higher, the D2D resource pool may be properly reduced to avoid radio resource waste; and when the D2D resource pool competition success rate is relatively lower, the D2D resource pool is expanded for more D2D UE to compete for, and when the D2D resource pool competition success rate is relatively higher, the D2D resource pool is properly reduced to avoid radio resource waste.

Furthermore, the eNodeB is required to send regulated D2D resource pool information to the D2D UE in a broadcast manner or an RRC dedicated signalling manner after performing D2D resource pool configuration optimization.

The eNodeB may also send the measurement information, received by itself, of the D2D resource pool to a TCE or a D2D management network element for the TCE or the D2D management network element to perform D2D resource pool configuration optimization.

Correspondingly, the TCE or the D2D management network element is also required to send regulated D2D resource pool information to the D2D UE after executing D2D resource pool configuration optimization.

Here, the D2D management network element may be a ProSe function or an added D2D management entity.

Embodiment 3

Figure 6:
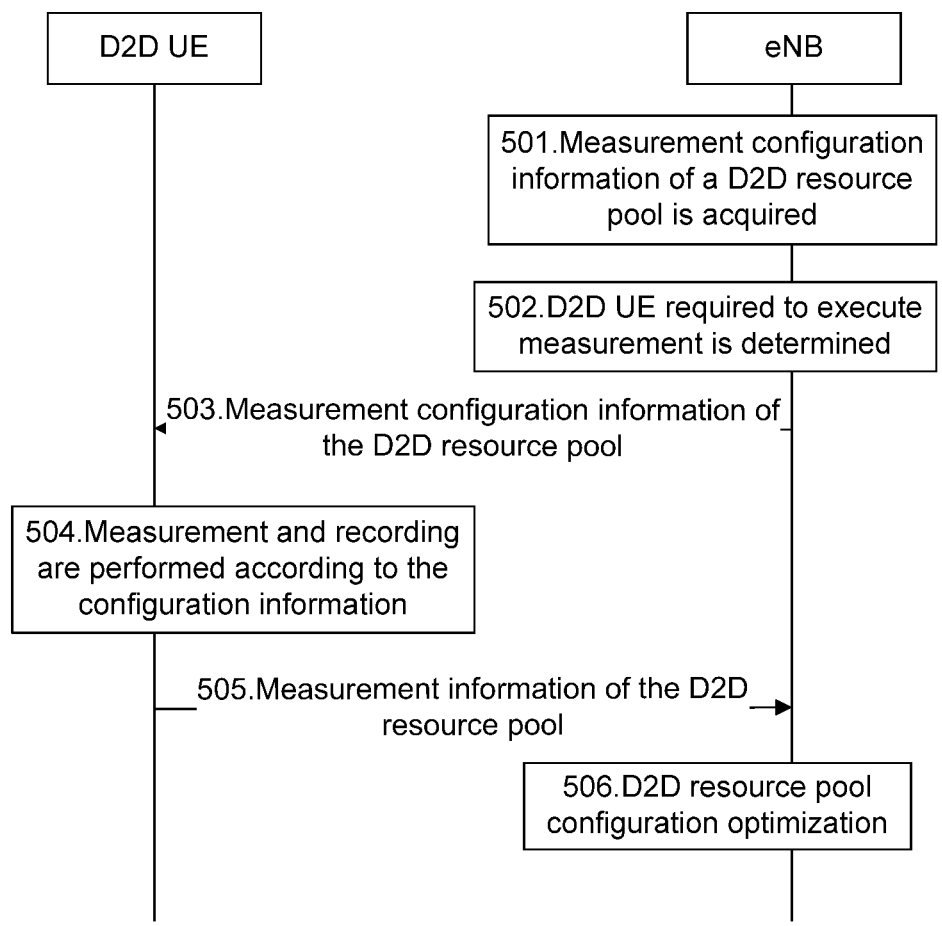
FIG. 6 is a detailed processing flowchart of a method for D2D resource pool measurement and reporting according to embodiment 3 of the disclosure.

An eNodeB configures immediate measurement and measurement reporting to UE through RRC dedicated signalling. A detailed processing flow of a method for D2D resource pool measurement and reporting in embodiment 3 of the disclosure, as shown in FIG. 6, includes the following steps.

Step 501: an eNodeB acquires measurement configuration information of a D2D resource pool.

Specifically, the eNodeB may receive the measurement configuration information, sent by an MME, of the D2D resource pool through an S1 interface initial context establishment request message, or a UE context modification request message, or an S1 handover request message, or a trace starting message or the like; or, the eNodeB receives the measurement configuration information, sent by a neighbour eNodeB, of the D2D resource pool through an X2 handover request message; or, the eNodeB receives the measurement configuration information, sent by an OAM system, of the D2D resource pool; or, the eNodeB autonomously determines the measurement configuration information of the D2D resource pool.

The measurement configuration information of the D2D resource pool includes any one or more of the following 1) to 7):

1) content information for measurement and reporting, configured to indicate that D2D resource pool measurement is configured, the content information for measurement and reporting including: resource pool load information and resource pool competition information;

2) D2D resource pool indication information, configured to indicate information of the D2D resource pool to be measured, the D2D resource pool indication information including: D2D discovery resource pool indication information, D2D communication resource pool indication information, D2D communication SA resource pool indication information, D2D communication data resource pool indication information and time domain and/or frequency domain information of the resource pool to be measured;

3) measurement area coverage information, configured to indicate area coverage to be measured, the measurement area coverage information including: a cell identifier list, or a TAC list, or a TAI list;

4) a measurement permitted PLMN list, configured to indicate information of a PLMN required to execute measurement, recording and reporting;

5) a reporting triggering condition type, configured to indicate a triggering condition type of D2D resource pool measurement information reporting of UE, the reporting triggering condition type including: event-triggered reporting, or periodic reporting, or event-triggered periodic reporting;

6) reporting triggering event information, applicable to the types of event-triggered reporting or event-triggered periodic reporting and configured to indicate a measurement reporting event of the UE, the reporting triggering event information including: a D2D resource pool load threshold value, or a threshold value for D2D resource competition failure number, or a threshold value for D2D resource competition failure rate, or a threshold value for D2D resource acquisition time, and the D2D resource pool load threshold value may be an occupation proportion value of a time domain of the D2D resource pool, and or a frequency domain of the D2D resource pool and or a channel; and 7) a reporting interval and the reporting number, applicable to the types of periodic reporting or event-triggered periodic reporting.

Step 502: the eNodeB determines D2D UE required to execute measurement.

Specifically, the eNodeB determines the D2D UE required to be configured to execute measurement and a content required to be measured and reported according to the D2D resource pool to be measured; and the eNodeB may determine the D2D UE required to execute measurement in the following manner.

1) When the D2D resource pool to be measured is a D2D discovery resource pool, a UE sending party randomly selects a resource for sending during D2D discovery, and does not monitor the resource pool before sending, so that the eNodeB may preferably select receiving UE for D2D discovery to measure and report a load of the D2D resource pool to be measured when monitoring the D2D discovery resource pool, measurement of the load of the D2D resource pool includes: measurement of average D2D resource pool receiving power and a detection success rate.

Here, the average D2D resource pool receiving power is average receiving power of D2D resources in the measured resource pool; the detection success rate is rate of correct detection of a D2D discovery signal in a D2D resource of which signal receiving power exceeds a certain threshold value, for example: correct CRC; and the threshold value of the signal receiving power may be acquired in a manner of presetting or default or configured by the eNodeB.

2) When the D2D resource pool to be measured is a D2D communication resource pool, or a D2D communication SA resource pool or a D2D communication data resource pool and a resource selection manner that sending UE in D2D communication randomly selects a resource for sending and the UE does not monitor the resource pool before sending the resource is adopted, the eNodeB may preferably select the receiving UE for D2D communication to measure and report a load of the D2D resource pool to be measured when monitoring the D2D communication resource pool, measurement of the load of the D2D resource pool includes: measurement of average D2D resource pool receiving power and a detection success rate.

Here, the average D2D resource pool receiving power is average receiving power of D2D resources in the measured resource pool; the detection success rate is rate of correct detection of a D2D discovery signal in a D2D resource of which signal receiving power exceeds a certain threshold value, for example: correct CRC; and the threshold value of the signal receiving power may be acquired in a manner of presetting or default or configured by the eNodeB.

3) When the D2D resource pool to be measured is a D2D communication resource pool, or a D2D communication SA resource pool or a D2D communication data resource pool and a resource selection manner that the sending UE in D2D communication monitors the resource pool before sending and judges whether a corresponding resource may be selected for D2D sending or not according to a power threshold value which is preset or determined as a default or configured by the eNodeB is adopted, the eNodeB may preferably select the sending UE for D2D communication to report a competition condition of the D2D resource pool to be measured, the competition condition of the D2D resource pool includes: the D2D resource competition failure number, a D2D resource competition failure rate or success rate and a D2D resource acquisition time value; and for example: the UE measures that signal receiving power of the corresponding resource is lower than the receiving power threshold value, and the sending UE considers that the corresponding resource may be used for D2D sending, that is, resource competition succeeds.

Step 503: the eNodeB sends the measurement configuration information of the D2D resource pool to the D2D UE through RRC dedicated signalling.

The RRC dedicated signalling may be a log measurement configuration message, or an added RRC dedicated message.

Specifically, the eNodeB acquires a D2D resource pool measurement or MDT measurement capability of the D2D UE at first, and then sends the measurement configuration information of the D2D resource pool to the D2D UE, that is: the eNodeB may judge whether to send the measurement configuration information to the D2D UE or not according to capability information of the D2D UE.

Here, when a cellular communication load of the eNodeB is relatively heavier and the resources are strained, corresponding D2D resource pool measurement reporting is configured to judge whether a part of D2D resources may be configured into cellular communication resources or not; and when the cellular communication load of the eNodeB is relatively lighter and the resources are relatively more abundant, corresponding D2D resource pool measurement reporting is configured to judge whether it is necessary to configure a part of the cellular communication resources into D2D resources or not.

Step 504: the D2D UE performs measurement and recording according to the received measurement configuration information of the D2D resource pool in an RRC connected state.

Specifically, when the configuration information includes the measurement area coverage information, for UE covered by a cellular network, whether an area where it is currently located meets the configured area coverage or not is checked at first, and if the area where the UE is located is within the configured area coverage, the D2D UE performs D2D resource pool measurement; or, when the configuration information includes a measurement PLMN list, for the UE covered by the cellular network, whether a registration PLMN is in the configured measurement PLMN list or not is judged at first, and when the PLMN of the UE belongs to the configured measurement PLMN list, the UE measures and records the D2D resource pool.

Step 505: the D2D UE reports measurement information of the D2D resource pool to the eNodeB through RRC dedicated signalling such as a measurement report message.

The measurement information of the D2D resource pool includes any one or more of the following 1) to 7).

1) D2D resource pool load information

The D2D resource pool load information includes any one or more of the following ① to ③:
- ① occupation proportion information of a time domain and/or frequency domain of the D2D resource pool and/or a PRB, and/or a D2D discovery resource unit and/or a D2D SA resource element, and the occupation proportion information of the D2D communication SA resource unit may be represented in form of percentage or represented by low, middle and high levels;
- ② information of a time domain and/or frequency domain of an occupied resource in the D2D resource pool and/or the PRB, and/or the D2D discovery resource unit and/or the D2D communication SA resource unit; and
- ② D resource pool receiving power information, and the D2D resource pool receiving power information is average receiving power information of the measured D2D resource pool.

The detection success rate information is specifically that: when the UE monitors a D2D discovery or D2D communication SA resource pool, if signal receiving power of a D2D discovery or D2D communication SA resource exceeds a specific threshold value, the D2D UE preliminarily judges that there is neighbour D2D UE sending a D2D discovery signal or D2D communication SA information on the D2D discovery or D2D communication SA resource, thereby performing an operation of baseband processing, demodulation and decoding on the signal received on the corresponding resource; if the D2D discovery signal or the D2D communication SA information may be correctly detected, for example, in case of correct CRC, it is determined that detection succeeds once; that is: a detection success rate is a rate of correct detection of the D2D discovery signal or the D2D communication SA information in the D2D resource of which the signal receiving power is higher than a certain threshold value, and the threshold value of the signal receiving power may be acquired in a manner of presetting or default or configured by the eNodeB.

Here, the D2D resource pool load information is an average value within a certain time; and the specific threshold value may be a preset value, or a default value, or a value configured by the eNodeB.

2) D2D resource pool competition information

The D2D resource pool competition information includes: the D2D resource competition failure number, the D2D resource competition failure rate or success rate and the D2D resource acquisition time value.

Specifically, during D2D communication, the D2D UE monitors the resource pool before selecting a resource sending, and when receiving power of the corresponding resource is lower than a specific threshold value, the UE determines that the resource may be used for D2D sending, that is, resource competition succeeds, otherwise determines that resource competition fails; and if the UE does not detect any available D2D resource within a D2D resource period, it may be determined that D2D resource competition fails once. The D2D resource competition failure rate is a ratio of the D2D resource competition failure number in N D2D resource periods to a D2D resource period number N. The D2D resource acquisition time value is a time length from resource competition starting of the D2D UE to successful acquisition of an available competition resource.

3) The D2D resource pool indication information is configured to indicate information of the measured D2D resource pool, the D2D resource pool indication information includes: the D2D discovery resource pool indication information, the D2D communication resource pool indication information, the D2D communication SA resource pool indication information, the D2D communication data resource pool indication information and the time domain and/or frequency domain information of the measured resource pool.

4) Serving cell information includes: information such as an ECGI and a PCI.

5) Registration PLMN or serving PLMN information, and/or home PLMN or PLMN list information of the D2D resource pool.

6) (An) RSRP and/or RSRQ measured value(s) of a serving cell and/or a neighbour cell.

7) Position information and time information at a measurement moment.

Step 506: the eNodeB performs D2D resource pool configuration optimization.

Specifically, after collecting resource pool measurement information of one or more pieces of D2D UE, the eNodeB may perform D2D resource pool configuration optimization according to the resource pool measurement information of the D2D UE.

The step that the eNodeB performs D2D resource pool configuration optimization according to the resource pool measurement information of the D2D UE includes that:

when the D2D resource pool is heavily loaded, for example: the occupation proportion of the time domain and/or frequency domain of the D2D resource pool, and/or the PRB, and/or the D2D discovery resource unit and/or the D2D communication SA resource unit is relatively higher or the receiving power of the resource pool is relatively higher and the detection success rate is relatively lower, the D2D resource pool may be expanded for more D2D UE to compete for;

when the D2D resource pool is lightly loaded, for example: the occupation proportion of the time domain and/or frequency domain of the D2D resource pool, and/or the PRB, and/or the D2D discovery resource unit and/or the D2D communication SA resource unit is relatively lower or the receiving power of the resource pool is relatively lower and the detection success rate is relatively higher, the D2D resource pool may be properly reduced to avoid radio resource waste; and when the D2D resource pool competition success rate is relatively lower, the D2D resource pool is expanded for more D2D UE to compete for, and when the D2D resource pool competition success rate is relatively higher, the D2D resource pool is properly reduced to avoid radio resource waste.

Furthermore, the eNodeB is required to send regulated D2D resource pool information to the D2D UE in a broadcast manner or an RRC dedicated signalling manner after performing D2D resource pool configuration optimization.

The eNodeB may also send the measurement information, received by itself, of the D2D resource pool to a TCE or a D2D management network element for the TCE or the D2D management network element to perform D2D resource pool configuration optimization.

Correspondingly, the TCE or the D2D management network element is also required to send regulated D2D resource pool information to the D2D UE after executing D2D resource pool configuration optimization.

Here, the D2D management network element may be a ProSe function or an added D2D management entity.

Embodiment 4

Figure 7:
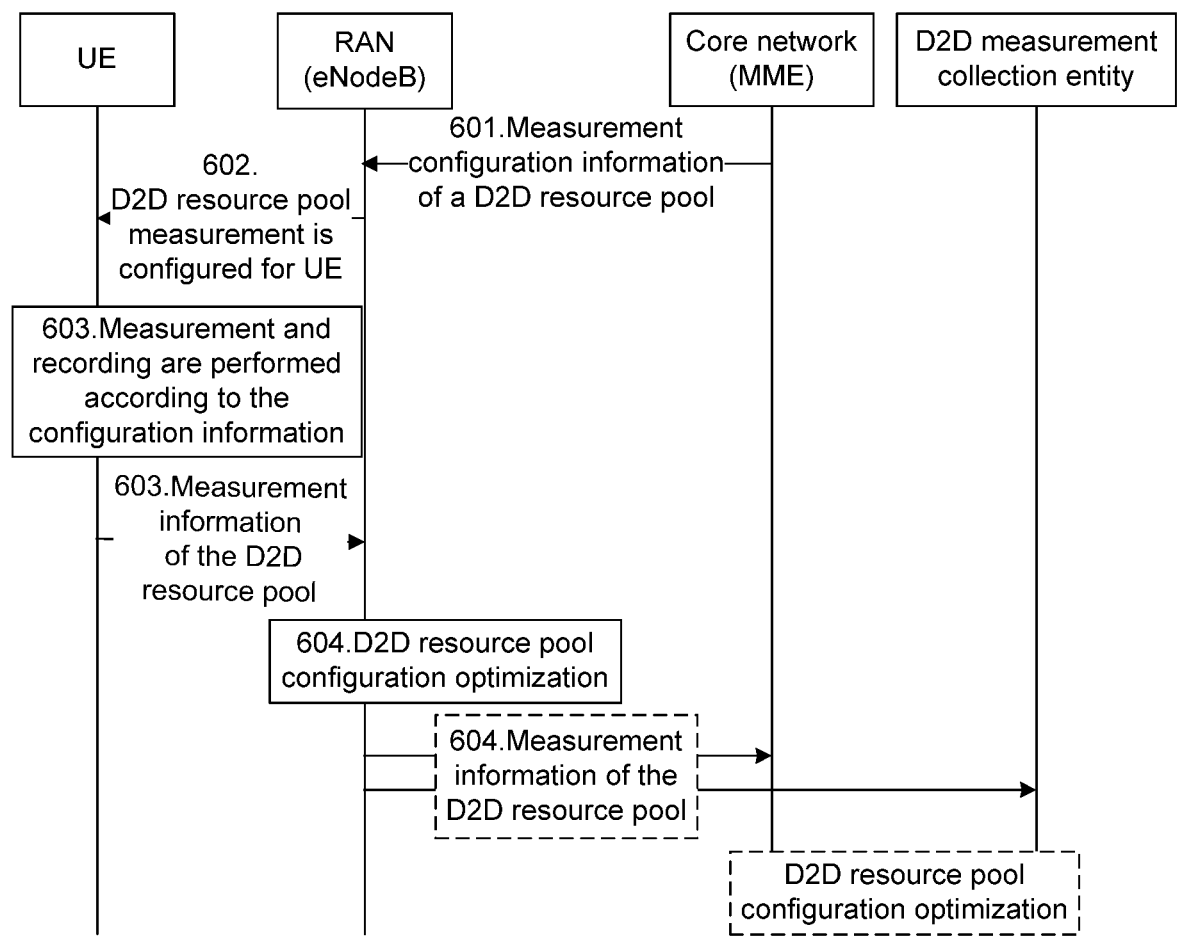
FIG. 7 is a detailed processing flowchart of a method for implementing D2D resource pool measurement and reporting in a signaling-based MDT flow according to embodiment 4 of the disclosure.

An eNodeB receives measurement configuration information from an MME. A detailed processing flow of a method for D2D resource pool measurement and reporting in a signalling-based MDT flow in embodiment 4 of the disclosure is shown in FIG. 7, MDT configuration transmission is for a UE granularity, and the method includes the following steps.

Step 601: an eNodeB acquires measurement configuration information of a D2D resource pool.

Specifically, the eNodeB may receive the measurement configuration information, sent by an MME, of the D2D resource pool through an S1 interface initial context establishment request message, or a UE context modification request message, or an S1 handover request message, or a trace starting message or the like.

The measurement configuration information of the D2D resource pool includes any one or more of the following 1) to 11):

1) a measurement and reporting type, the measurement and reporting type including: an immediate type and/or a log manner;

2) content information for measurement and reporting, configured to indicate that D2D resource pool measurement is configured, the content information for measurement and reporting including: resource pool load information and resource pool competition information;

3) D2D resource pool indication information, configured to indicate information of the D2D resource pool to be measured, the D2D resource pool indication information including: D2D discovery resource pool indication information, D2D communication resource pool indication information, D2D communication SA resource pool indication information, D2D communication data resource pool indication information and time domain and/or frequency domain information of the resource pool to be measured;

4) measurement area coverage information, configured to indicate area coverage to be measured, the measurement area coverage information including: a cell identifier list, or a TAC list, or a TAI list;

5) a measurement permitted PLMN list, configured to indicate information of a PLMN required to execute measurement, recording and reporting;

6) a reporting triggering condition type, configured to indicate a triggering condition type of D2D resource pool measurement information reporting of UE in the immediate measurement reporting manner, the reporting triggering condition type including: event-triggered reporting, or periodic reporting, or event-triggered periodic reporting;

7) reporting triggering event information, applicable to the types of event-triggered reporting or event-triggered periodic reporting in the immediate measurement reporting manner and configured to indicate a measurement reporting event of the UE, the reporting triggering event information including any one or more of the following ① to ⑥:

① a threshold value of an occupation proportion of a time domain of the D2D resource pool, and/or a frequency domain of the D2D resource pool, and/or a PRB, and/or a D2D discovery resource unit and/or a D2D communication SA resource unit;

② a D2D resource pool receiving power threshold value;

③ a threshold value for detecting success rate or failure rate;

④ a threshold value for D2D resource competition failure number;

⑤ a threshold value for D2D resource competition failure rate;

⑥ a threshold value for D2D resource acquisition time;

8) a reporting interval and the reporting number, applicable to the types of periodic reporting or event-triggered periodic reporting in the immediate measurement reporting manner;

9) a UE state, configured to indicate a state in which the UE is required to execute configured measurement, including: an RRC connected state, and/or an RRC IDLE state and/or a cellular network uncovered state;

10) a UE type, configured to indicate a UE type required to be configured to execute measurement, the UE type including: D2D sending UE, D2D receiving UE, a D2D discovery sending party, a D2D discovery receiving party, a D2D communication sending party, a D2D communication receiving party and D2D UE; and 11) a log recording interval and a log recording duration, configured to the log measurement reporting manner.

Step 602: the eNodeB configures corresponding measurement to D2D UE according to the received measurement configuration information of the D2D resource pool.

Specifically, the eNodeB acquires a D2D resource pool measurement capability or MDT measurement capability of the D2D UE at first, and then sends the measurement configuration information of the D2D resource pool to the D2D UE, that is: the eNodeB may judge whether to send the measurement configuration information to the D2D UE or not according to capability information of the D2D UE.

Furthermore, the eNodeB may determine whether to send the measurement configuration information to the D2D UE or not according to the configured D2D UE type.

Here, when the immediate measurement reporting manner is required to be configured and the measurement configuration information includes the measurement area coverage information, the eNodeB detects whether an area where the D2D UE is located belongs to the configured measurement area coverage or not, for example: whether a serving cell of the D2D UE belongs to a cell list in the configured measurement area coverage or not; if YES, the measurement configuration information is sent to the D2D UE; and if NO, the measurement configuration information is not sent to the D2D UE. When the log measurement reporting manner is required to be configured, the eNodeB sends the measurement configuration information to the D2D UE.

Step 603: the D2D UE performs measurement according to the received measurement configuration information, and sends measurement information to the eNodeB.

Specifically, the eNodeB may perform local processing, such as D2D resource pool configuration optimization after receiving the measurement configuration information reported by the D2D UE; or, the eNodeB may send collected measurement information of the D2D resource pool of one or more pieces of D2D UE to a core network element or a D2D measurement collection entity.

The core network element is an MME, and the D2D measurement collection entity includes: a measurement collection entity, or a ProSe function, or an added D2D management entity.

Step 604: after receiving the measurement information of the D2D resource pool, the core network element or the D2D measurement collection entity performs D2D resource pool configuration optimization according to the measurement information of the D2D resource pool, and sends regulated D2D resource pool information to the eNodeB.

Embodiment 5

Figure 8:
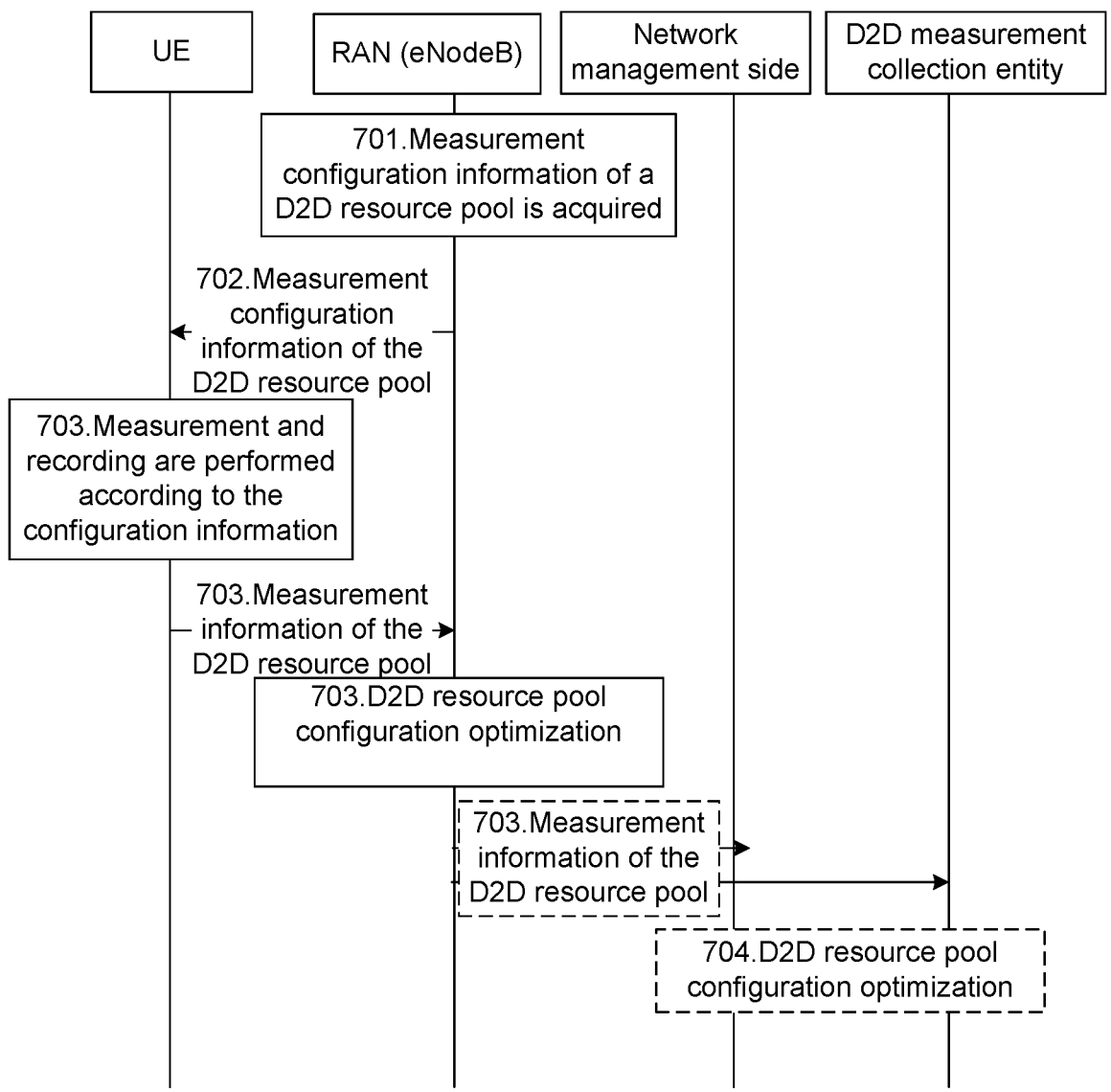
FIG. 8 is a detailed processing flowchart of a method for implementing D2D resource pool measurement and reporting in a management-based MDT flow according to embodiment 5 of the disclosure.

An eNodeB receives measurement configuration information from an MME. A detailed processing flow of a method for D2D resource pool measurement and reporting in a management-based MDT flow in embodiment 5 of the disclosure is shown in FIG. 8. MDT configuration transmission is for D2D UE in a certain area, and the method includes the following steps.

Step 701: an eNodeB acquires measurement configuration information of a D2D resource pool.

Specifically, the eNodeB acquires the measurement configuration information of the D2D resource pool by receiving a Trace Session Activation message, and activates MDT measurement.

The measurement configuration information of the D2D resource pool may include any one or more of the following 1) to 11):

1) a measurement and reporting type, the measurement and reporting type including: an immediate type and/or a log manner;

2) content information for measurement and reporting, configured to indicate that D2D resource pool measurement is configured, the content information for measurement and reporting including: resource pool load information and resource pool competition information;

3) D2D resource pool indication information, configured to indicate information of the D2D resource pool to be measured, the D2D resource pool indication information including: D2D discovery resource pool indication information, D2D communication resource pool indication information, D2D communication SA resource pool indication information, D2D communication data resource pool indication information and time domain and/or frequency domain information of the resource pool to be measured;

4) measurement area coverage information, configured to indicate area coverage to be measured, the measurement area coverage information including: a cell identifier list, or a TAC list, or a TAI list;

5) a measurement PLMN list, configured to indicate information of a PLMN required to execute measurement, recording and reporting;

6) a reporting triggering condition type, configured to indicate a triggering condition type of D2D resource pool measurement information reporting of UE in the immediate measurement reporting manner, the reporting triggering condition type including: event-triggered reporting, or periodic reporting, or event-triggered periodic reporting;

7) reporting triggering event information, applicable to the types of event-triggered reporting or event-triggered periodic reporting in the immediate measurement reporting manner and configured to indicate a measurement reporting event of the UE, the reporting triggering event information including any one or more of the following ① to ⑥:

① a threshold value of an occupation proportion of a time domain of the D2D resource pool, and/or a frequency domain of the D2D resource pool, and/or a PRB, and/or a D2D discovery resource unit and/or a D2D communication SA resource unit;

② a D2D resource pool receiving power threshold value;

③ a threshold value for detecting success rate or failure rate;

④ a threshold value for D2D resource competition failure number;

⑤ a threshold value for D2D resource competition failure rate;

⑥ a threshold value for D2D resource acquisition time;

8) a reporting interval and the reporting number, applicable to the types of periodic reporting or event-triggered periodic reporting in the immediate measurement reporting manner;

9) a UE state, configured to indicate a state in which the UE is required to execute configured measurement, including: an RRC connected state, and/or an RRC IDLE state and/or a cellular network uncovered state;

10) a UE type, configured to indicate a UE type required to be configured to execute measurement, the UE type including: D2D sending UE, D2D receiving UE, a D2D discovery sending party, a D2D discovery receiving party, a D2D communication sending party, a D2D communication receiving party and D2D UE; and 11) a log recording interval and a log recording duration, configured to the log measurement reporting manner.

Here, when the D2D UE performs X2 handover, the source eNodeB is required to transmit the measurement configuration information of the D2D resource pool of the D2D UE to a target eNodeB through an X2 handover request message. For example, when the UE performs intra-PLMN handover, or inter-PLMN handover during which a target PLMN belongs to the configured measurement PLMN list, the source eNodeB transmits the measurement configuration information of the D2D resource pool of the D2D UE to the target eNodeB through an X2 handover request message.

Step 702: the eNodeB configures corresponding measurement to D2D UE according to the received measurement configuration information of the D2D resource pool.

Specifically, the eNodeB acquires a D2D resource pool measurement capability or MDT measurement capability of the D2D UE at first, and then sends the measurement configuration information of the D2D resource pool to the D2D UE, that is: the eNodeB may judge whether to send the measurement configuration information to the D2D UE or not according to capability information of the D2D UE.

Furthermore, the eNodeB may determine whether to send the measurement configuration information to the D2D UE or not according to the configured D2D UE type.

Here, the eNodeB selects proper D2D UE according to the area coverage information in the measurement configuration information of the D2D resource pool and measurement related UE willing information in a UE context, and configures D2D resource pool measurement to the D2D UE.

Step 703: the D2D UE performs measurement according to the received measurement configuration information, and sends measurement information to the eNodeB.

Specifically, the eNodeB may perform local processing, such as D2D resource pool configuration optimization after receiving the measurement configuration information reported by the D2D UE; or, the eNodeB may send collected measurement information of the D2D resource pool of one or more pieces of D2D UE to a network management system or a D2D measurement collection entity.

The D2D measurement collection entity includes: a measurement collection entity, or a ProSe function, or an added D2D management entity.

Step 704: after receiving the measurement information of the D2D resource pool, the network management system or the D2D measurement collection entity performs D2D resource pool configuration optimization according to the measurement information of the D2D resource pool, and sends regulated D2D resource pool information to the eNodeB.

Figure 9:
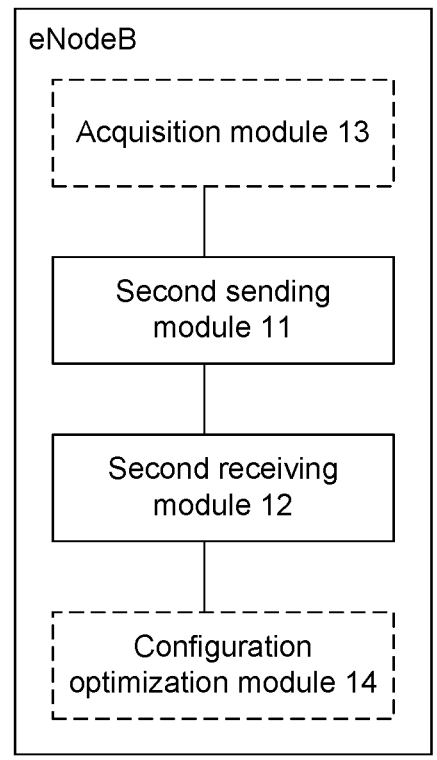
FIG. 9 is a structure diagram of an eNodeB according to an embodiment of the disclosure.

In order to implement the abovementioned method for D2D resource pool measurement and reporting, the embodiment of the disclosure also provides an eNodeB. A structure of the eNodeB, as shown in FIG. 9, includes: a second sending module 11 and a second receiving module 12, the second sending module 11 is configured to send measurement configuration information of a D2D resource pool to D2D UE, the measurement configuration information of the D2D resource pool being configured for the D2D UE to measure the D2D resource pool.

Specifically, the second sending module 11 sends the measurement configuration information of the D2D resource pool to the D2D UE through air interface dedicated signalling; or, the eNodeB sends the measurement configuration information of the D2D resource pool to the D2D UE through a broadcast message.

The air interface dedicated signalling includes: an RRC reconfiguration message, a log measurement configuration message and the like.

The measurement configuration information of the D2D resource pool includes: any one or more of measurement and reporting indication information, a measurement and reporting type, measurement area coverage information, content information for measurement and reporting, a reporting triggering condition type, information of a reporting triggering event, a reporting interval, the reporting number, a log recording interval, a log recording duration, a measurement permitted PLMN list, the D2D resource pool indication information, a UE state and a UE type.

The measurement and reporting type includes: an immediate manner or a log manner;

the measurement area coverage information includes: any one or more of a cell identifier list, or a TAC list or a TAI list;

the reporting triggering condition type includes: event-triggered reporting, or periodic reporting or event-triggered periodic reporting;

the UE state includes: an RRC connected state, and/or an RRC IDLE state and/or a cellular network uncovered state;

the UE type includes: a D2D discovery sending party, a D2D discovery receiving party, a D2D communication sending party, a D2D communication receiving party, D2D receiving UE and D2D UE;

the content information for measurement and reporting includes: D2D resource pool measurement, D2D resource pool load information and D2D resource pool competition information;

the information of the reporting triggering event includes: any one or more of a threshold value of an occupation proportion of a time domain of the D2D resource pool, and/or a frequency domain of the D2D resource pool, and/or a PRB, and/or a D2D discovery resource unit and/or a D2D communication SA resource unit, a D2D resource pool receiving power threshold value, a threshold value for detecting success rate or failure rate, a threshold value for D2D resource competition failure number, a threshold value for D2D resource competition failure rate and a threshold value for D2D resource acquisition time;

here, when a competition-based resource acquisition manner is adopted, whether D2D resource competition succeeds or not is determined according to whether signal receiving power is higher than the preset threshold value or not, it is determined that D2D resource competition succeeds when the receiving power is higher than the preset threshold value, otherwise it is determined that D2D resource competition fails; and the D2D resource pool indication information includes: any one or more of D2D discovery resource pool indication information, D2D communication resource pool indication information, D2D communication SA resource pool indication information, D2D communication data resource pool indication information and time domain and/or frequency domain information of the resource pool to be measured.

The second receiving module 12 is configured to receive measurement information of the D2D resource pool.

Specifically, the second receiving module 12 is configured to receive the measurement information, sent by the D2D UE, of the D2D resource pool.

In an embodiment, the second receiving module 12 is further configured to receive the measurement configuration information of the D2D resource pool; and correspondingly, the eNodeB further includes an acquisition module 13, configured to acquire D2D resource pool measurement capability information or MDT capability information of the D2D UE according to the measurement configuration information, received by the second receiving module 12, of the D2D resource pool.

Specifically, the second receiving module 12 receives the measurement configuration information, sent by an MME, of the D2D resource pool through an S1 interface message; or, the second receiving module 12 receives the measurement configuration information, sent by a neighbour eNodeB, of the D2D resource pool through an X2 interface message; or, the second receiving module 12 receives the measurement configuration information, sent by an OAM system, of the D2D resource pool, the S1 interface message includes: a UE initial context establishment request message, a UE context modification request message, an S1 handover request message and a trace starting message; and the X2 interface message includes an X2 handover request message.

In an embodiment, the second sending module 11 is specifically configured to send the measurement configuration information of the D2D resource pool to the D2D UE through air interface dedicated signalling; or, send the measurement configuration information of the D2D resource pool to the D2D UE through a broadcast message.

In an embodiment, the eNodeB further includes: a configuration optimization module 14, configured to execute D2D resource pool configuration optimization according to the received measurement information of the D2D resource pool; or, send the received measurement information of the D2D resource pool to a TCE or a D2D management network element, the measurement information of the D2D resource pool being configured for the TCE or the D2D management network element to execute D2D resource pool configuration optimization.

Figure 10:
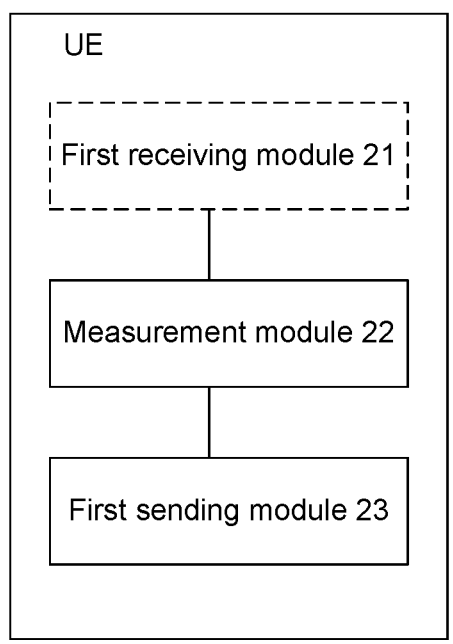
FIG. 10 is a structure diagram of UE according to an embodiment of the disclosure.

In order to implement the abovementioned method for D2D resource pool measurement and reporting, the embodiment of the disclosure also provides UE. A structure of the UE, as shown in FIG. 10, includes: a measurement module 22 and a first sending module 23, the measurement module 22 is configured to measure a D2D resource pool; and the first sending module 23 is configured to send measurement information of the D2D resource pool to an eNodeB.

In an embodiment, the UE further includes: a first receiving module 21, configured to receive measurement configuration information, sent by the eNodeB, of the D2D resource pool.

Here, the measurement configuration information of the D2D resource pool includes: any one or more of measurement and reporting indication information, a measurement and reporting type, measurement area coverage information, content information for measurement and reporting, a reporting triggering condition type, information of a reporting triggering event, a reporting interval, the reporting number, a log recording interval, a log recording duration, a measurement permitted PLMN list, D2D resource pool indication information, a UE state and a UE type.

The measurement and reporting type includes: an immediate manner or a log manner;

the measurement area coverage information includes: any one or more of a cell identifier list, or a TAC list or a TAI list;

the reporting triggering condition type includes: event-triggered reporting, or periodic reporting or event-triggered periodic reporting;

the UE state includes: an RRC connected state, and/or an RRC IDLE state and/or a cellular network uncovered state;

the UE type includes: a D2D discovery sending party, a D2D discovery receiving party, a D2D communication sending party, a D2D communication receiving party, D2D receiving UE and D2D UE;

the content information for measurement and reporting includes: D2D resource pool measurement, D2D resource pool load information and D2D resource pool competition information;

the information of the reporting triggering event includes: any one or more of a threshold value of an occupation proportion of the time domain of the D2D resource pool, and/or the frequency domain of the D2D resource pool, and/or the PRB, and/or the D2D discovery resource unit and/or the D2D communication SA resource unit, a D2D resource pool receiving power threshold value, a threshold value for detecting success rate or failure rate, a threshold value for D2D resource competition failure number, a threshold value for D2D resource competition failure rate and a threshold value for D2D resource acquisition time;

here, when a competition-based resource acquisition manner is adopted, whether D2D resource competition succeeds or not is determined according to whether signal receiving power is higher than the preset threshold value or not, it is determined that D2D resource competition succeeds when the receiving power is higher than the preset threshold value, otherwise it is determined that D2D resource competition fails; and the D2D resource pool indication information includes: any one or more of D2D discovery resource pool indication information, D2D communication resource pool indication information, D2D communication SA resource pool indication information, D2D communication data resource pool indication information and time domain and/or frequency domain information of the resource pool to be measured.

In an embodiment, the measurement module 22 is specifically configured to measure the D2D resource pool when the UE is in the RRC connected state.

The measurement module 22 measures the D2D resource pool according to a predefined rule when the UE does not receive the measurement configuration information of the D2D resource pool; and the measurement module 22 measures the D2D resource pool according to the measurement configuration information of the D2D resource pool after the UE receives the measurement configuration information of the D2D resource pool, the predefined rule is default configuration information in the UE.

Correspondingly, the first sending module 23 is specifically configured to send the measurement information of the D2D resource pool to the eNodeB when the UE is in the RRC connected state, or, is specifically configured to measure the D2D resource pool when the UE is in the RRC connected state; and correspondingly, the first sending module 23 is configured to, when a reporting condition is met, send the measurement information of the D2D resource pool to the eNodeB.

In an embodiment, the first sending module 23 is specifically configured to send log measurement available indication information to the eNodeB, receive log reporting request information sent by the eNodeB, and send the measurement information of the D2D resource pool to the eNodeB through a UE information response message.

In an embodiment, the operation that the first sending module 23 sends the log measurement available indication information to the eNodeB includes that: the first sending module 23 sends the log measurement available indication information to the eNodeB through an RRC connection establishment completion message, or an RRC reestablishment completion message or an RRC reconfiguration completion message; and/or, the operation that the second sending module 23 receives the log reporting request information sent by the eNodeB includes that: the first sending module 23 receives the log reporting request information sent by the eNodeB through a UE information request message.

Here, the measurement information of the D2D resource pool includes: any one or more of the D2D resource pool load information, the D2D resource pool competition information, the D2D resource pool indication information, serving cell information at a recording moment, registration PLMN or serving PLMN information, home PLMN or PLMN list information of the D2D resource pool, (an) RSRP and/or RSRQ measured value(s) of a serving cell and/or a neighbour cell, position information and time information.

The D2D resource pool load information includes: any one or more of occupation proportion information of a time domain and/or frequency domain of the D2D resource pool, and/or a PRB, and/or a D2D discovery resource unit and/or a D2D SA resource element, average D2D resource pool receiving power information, detection success rate information and information of a time domain and/or frequency domain of an occupied resource in the D2D resource pool, and/or the PRB, and/or the D2D discovery resource unit and/or the D2D communication SA resource unit.

Average D2D resource pool receiving power is average receiving power of D2D resources in the whole resource pool; the average D2D resource pool receiving power is the average receiving power of the D2D resources in the measured resource pool; the detection success rate is a rate of correct detection of a D2D discovery signal in a D2D resource of which signal receiving power exceeds a certain threshold value, for example: correct rate of Cyclic Redundancy Check (CRC); and the threshold value of the signal receiving power may be acquired in a manner of presetting or default or configured by the eNodeB.

The D2D resource pool competition information includes: any one or more of the D2D resource competition failure number, a D2D resource competition failure rate or success rate and a D2D resource acquisition time value; and a D2D resource acquisition time refers to a time from initiation of D2D resource competition to acquisition of an available resource.

The D2D resource pool indication information includes: any one or more of the D2D discovery resource pool indication information, the D2D communication resource pool indication information, the D2D communication SA resource pool indication information, the D2D communication data resource pool indication information and the time domain and/or frequency domain information of the measured resource pool; and the resource pool indication information may be 1-bit, and 2 values in 1 bit indicate that what is measured is a D2D discovery resource pool or a D2D communication resource pool.

The second sending module 11, second receiving module 12, acquisition module 13 and configuration optimization module 14 in the eNodeB disclosed in the embodiment of the disclosure may all be implemented by a processor, and of course, may also be implemented by a specific logical circuit, and the processor may be a processor on the eNodeB, and during a practical application, the processor may be a Central Processing Unit (CPU), a Micro Processing Unit (MPU), a Digital Signal Processor (DSP), a Field-Programmable Gate Array (FPGA) or the like.

The first receiving module 21, measurement module 22 and first sending module 23 in the UE disclosed in the embodiment of the disclosure may all be implemented by a processor, and of course, may also be implemented by a specific logical circuit, and the processor may be a processor on the UE, and during a practical application, the processor may be a CPU, an MPU, a DSP, an FPGA or the like.

In the embodiment of the disclosure, if being implemented in form of software function module and sold or used as an independent product, the abovementioned method for D2D resource pool measurement and reporting may also be stored in a computer-readable storage medium. Based on such an understanding, the technical solutions of the embodiment of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The abovementioned storage medium includes: various media capable of storing program codes such as a U disk, a mobile hard disk, a Read Only Memory (ROM), a magnetic disk or an optical disk. Therefore, the embodiment of the disclosure is not limited to any specific hardware and software combination.

Correspondingly, the embodiment of the disclosure also provides a computer storage medium, in which a computer program is stored, the computer program being configured to execute the method for D2D resource pool measurement and reporting of the embodiment of the disclosure.

The above is only the preferred embodiment of the disclosure and not intended to limit the scope of protection of the disclosure.

What is claimed is:

1. A method for Device to Device (D2D) resource pool measurement and reporting, comprising:
   receiving, by a User Equipment (UE), measurement configuration information of a D2D resource pool, wherein the measurement configuration information of the D2D resource pool is configured for the UE to measure the D2D resource pool and the measurement configuration information of the D2D resource pool comprises D2D resource pool indication information, and the D2D resource pool indication information is configured to indicate information of a D2D communication resource pool to be measured;
   measuring, by the UE, the D2D resource pool according to the measurement configuration information of the D2D resource pool; and
   sending measurement information of the D2D resource pool,
   wherein the measurement information of the D2D resource pool comprises D2D resource pool load information, and the D2D resource pool load information comprises: occupation proportion information of at least one of a time domain or frequency domain of at least one of the D2D resource pool, a Physical Resource Block (PRB), or a D2D discovery resource unit;
   wherein the sending the measurement information of the D2D resource pool comprises: sending, by the UE, the measurement information of the D2D resource pool to the eNodeB through a measurement report message;
   wherein the D2D resource pool indication information comprises D2D communication data resource pool indication information;
   wherein the measurement information of the D2D resource pool further comprises at least one of the following:
   D2D resource pool competition information, D2D resource pool indication information, serving cell information at a recording moment, registration Public Land Mobile Network (PLMN) or serving PLMN information, home PLMN or PLMN list information of the D2D resource pool, measured value of Reference Signal Receiving Power (RSRP) of a serving cell, measured value of RSRP of a neighbour cell, measured value of Reference Signal Receiving Quality (RSRQ) of the serving cell, measured value of RSRQ of the neighbour cell, position information or time information;
   wherein at least one of: the D2D resource pool competition information comprises at least one of the following: a D2D resource competition failure number, a D2D resource competition failure rate or success rate or a D2D resource acquisition time value.

2. The method according to claim 1, wherein the measuring, by the UE, the D2D resource pool according to the measurement configuration information of the D2D resource pool and sending the measurement information of the D2D resource pool comprises:
   measuring, by the UE, the D2D resource pool in at least one of a Radio Resource Control (RRC) connected state, an RRC IDLE state, or a cellular network uncovered state, and sending the measurement information of the D2D resource pool to an Evolved Node B (eNodeB) in the RRC connected state; or,
   measuring, by the UE, the D2D resource pool in an RRC connected state, and when a reporting condition is met, sending the measurement information of the D2D resource pool to an eNodeB.

3. The method according to claim 1, wherein the measurement configuration information of the D2D resource pool further comprises at least one of the following:
   measurement and reporting indication information, a measurement and reporting type, measurement area coverage information, content information for measurement and reporting, a reporting triggering condition type, information of a reporting triggering event, a reporting interval, a reporting number, a log recording interval, a log recording duration, a measurement permitted Public Land Mobile Network (PLMN) list, a UE state or a UE type.

4. The method according to claim 3, wherein at least one of:
   the measurement and reporting type comprises: an immediate manner or a log manner;
   the measurement area coverage information comprises: a cell identifier list, or a Tracking Area Code (TAC) list or a Tracking Area Identity (TAI) list;
   the reporting triggering condition type comprises: event-triggered reporting, or periodic reporting, or event-triggered periodic reporting;
   the UE type comprises: a D2D discovery sending party, a D2D discovery receiving party, a D2D communication sending party, a D2D communication receiving party, D2D receiving UE and D2D UE;
   the content information for measurement and reporting comprises: D2D resource pool measurement, the D2D resource pool load information, and the D2D resource pool competition information;
   the information of the reporting triggering event comprises at least one of the following: a threshold value of an occupation proportion of at least one of a time domain of the D2D resource pool or a frequency domain of at least one of the D2D resource pool, the PRB, or the D2D discovery resource unit,
   a D2D resource pool receiving power threshold value,
   a threshold value for detecting success rate or failure rate,
   a threshold value for D2D resource competition failure number,
   a threshold value for D2D resource competition failure rate or
   a threshold value for D2D resource acquisition time; or,
   the D2D resource pool indication information comprises at least one of the following: D2D discovery resource pool indication information, D2D communication resource pool indication information, D2D communication SA resource pool indication information, D2D communication data resource pool indication information or at least one of time domain or frequency domain information of the D2D resource pool to be measured.

5. A non-transitory computer storage medium, in which a computer-executable instruction is stored, the computer-executable instruction being configured to execute the method according to claim 1.

6. The method according to claim 1, wherein the D2D resource pool load information further comprises at least one of the following:
   average D2D resource pool receiving power information;
   detection success rate information; or
   information of at least one of a time domain or frequency domain of an occupied resource in at least one of the D2D resource pool, the PRB, or the D2D discovery resource unit.

7. A method for Device to Device (D2D) resource pool measurement and reporting, comprising:
  sending, by an Evolved Node B (eNodeB), measurement configuration information of a D2D resource pool, the measurement configuration information of the D2D resource pool being configured for D2D User Equipment (UE) to measure the D2D resource pool and comprising D2D resource pool indication information, and the D2D resource pool indication information is configured to indicate information of a D2D communication resource pool to be measured; and
  receiving measurement information of the D2D resource pool,
  wherein the measurement information of the D2D resource pool comprises D2D resource pool load information, and
  the D2D resource pool load information comprises:
  occupation proportion information of at least one of a time domain or frequency domain of at least one of the D2D resource pool, a Physical Resource Block (PRB), or a D2D discovery resource unit;
  wherein, before the sending, by the eNodeB, the measurement configuration information of the D2D resource pool, the method further comprises at least one of:
  receiving, by the eNodeB, the measurement configuration information of the D2D resource pool; or
  acquiring D2D resource pool measurement capability information or Minimization of Drive Test (MDT) capability information of the D2D UE;
  wherein the D2D resource pool indication information comprises D2D communication data resource pool indication information;
  wherein the measurement information of the D2D resource pool further comprises at least one of the following:
  D2D resource pool competition information, D2D resource pool indication information, serving cell information at a recording moment, registration Public Land Mobile Network (PLMN) or serving PLMN information, home PLMN or PLMN list information of the D2D resource pool, measured value of Reference Signal Receiving Power (RSRP) of a serving cell, measured value of RSRP of a neighbour cell, measured value of Reference Signal Receiving Quality (RSRQ) of the serving cell, measured value of RSRQ of the neighbour cell, position information or time information;
  wherein at least one of the D2D resource pool competition information comprises at least one of the following: D2D resource competition failure number, a D2D resource competition failure rate; or success rate or a D2D resource acquisition time value.

8. The method according to 7, wherein receiving, by the eNodeB, the measurement configuration information of the D2D resource pool comprises:
  receiving, by the eNodeB, the measurement configuration information, sent by a Mobility Management Entity (MME), of the D2D resource pool through an S1 interface message; or,
  receiving, by the eNodeB, the measurement configuration information, sent by a neighbour eNodeB, of the D2D resource pool through an X2 interface message; or,
  receiving, by the eNodeB, the measurement configuration information, sent by an Operation and Maintenance (OAM) system, of the D2D resource pool.

9. The method according to claim 7, wherein sending, by the eNodeB, the measurement configuration information of the D2D resource pool comprises:
  sending, by the eNodeB, the measurement configuration information of the D2D resource pool to the D2D UE through air interface dedicated signaling; or,
  sending, by the eNodeB, the measurement configuration information of the D2D resource pool to the D2D UE through a broadcast message.

10. The method according to claim 7, after receiving the measurement information of the D2D resource pool, further comprising:
  executing, by the eNodeB, D2D resource pool configuration optimization according to the received measurement information of the D2D resource pool; or,
  sending, by the eNodeB, the received measurement information of the D2D resource pool to a Trace Collection Entity (TCE) or a D2D management network element, the measurement information of the D2D resource pool being configured for the TCE or the D2D management network element to execute D2D resource pool configuration optimization.

11. The method according to claim 7, wherein the measurement configuration information of the D2D resource pool further comprises at least one of the following:
  measurement and reporting indication information, a measurement and reporting type, measurement area coverage information, content information for measurement and reporting, a reporting triggering condition type, information of a reporting triggering event, a reporting interval, a reporting number, a log recording interval, a log recording duration, a measurement permitted Public Land Mobile Network (PLMN) list, a UE state or a UE type.

12. The method according to claim 11, wherein at least one of:
  the measurement and reporting type comprises: an immediate manner or a log manner;
  the measurement area coverage information comprises: a cell identifier list, or a Tracking Area Code (TAC) list or a Tracking Area Identity (TAI) list; and/or,
  the reporting triggering condition type comprises: event-triggered reporting, or periodic reporting or event-triggered periodic reporting;
  the UE type comprises: a D2D discovery sending party, a D2D discovery receiving party, a D2D communication sending party, a D2D communication receiving party, D2D receiving UE and D2D UE;
  the content information for measurement and reporting comprises: D2D resource pool measurement, D2D resource pool load information and D2D resource pool competition information;
  the information of the reporting triggering event comprises at least one of the following: a threshold value of an occupation proportion of at least one of a time domain of the D2D resource pool or a frequency domain of at least one of the D2D resource pool, the PRB, or the D2D discovery resource unit,
  a D2D resource pool receiving power threshold value,
  a threshold value for detecting success rate or failure rate,
  a threshold value for D2D resource competition failure number,
  a threshold value for D2D resource competition failure rate or
  a threshold value for D2D resource acquisition time; or,
  the D2D resource pool indication information comprises at least one of the following: D2D discovery resource pool indication information, D2D communication resource pool indication information, D2D communication SA resource pool indication information, D2D communication data resource pool indication information, or at least one of time domain or frequency domain information of the D2D resource pool to be measured.

13. A non-transitory computer storage medium, in which a computer-executable instruction is stored, the computer-executable instruction being configured to execute the method according to claim 7.

14. The method according to claim 7, wherein the D2D resource pool load information further comprises at least one of the following:
   average D2D resource pool receiving power information; detection success rate information; or
   information of at least one of a time domain or frequency domain of an occupied resource in at least one of the D2D resource pool, the PRB, or the D2D discovery resource unit.

15. A User Equipment (UE), comprising:
a processor; and
a memory for storing instructions executable by the processor;
wherein the processor is configured to perform;
receiving measurement configuration information of a Device to Device (D2D) resource pool, wherein the measurement configuration information of the D2D resource pool is configured for the UE to measure the D2D resource pool and the measurement configuration information of the D2D resource pool comprises D2D resource pool indication information, and the D2D resource pool indication information is configured to indicate information of a D2D communication resource pool to be measured;
measure the D2D resource pool according to the measurement configuration information of the D2D resource pool; and
sending measurement information of the D2D resource pool,
wherein the measurement information of the D2D resource pool comprises
D2D resource pool load information, and the D2D resource pool load information comprises:
occupation proportion information of at least one of a time domain or frequency domain of at least one of the D2D resource pool, a Physical Resource Block (PRB), or a D2D discovery resource unit;
wherein the sending: measurement information of the D2D resource pool comprises:
sending the measurement information of the D2D resource pool to the eNodeB through a measurement report message;
wherein the D2D resource pool indication information comprises D2D communication data resource pool indication information;
wherein the measurement information of the D2D resource pool further comprises at least one of the following:
D2D resource pool competition information, D2D resource pool indication information, serving cell information at a recording moment, registration Public Land Mobile Network (PLMN) or serving PLMN information, home PLMN or PLMN list information of the D2D resource pool, measured value of Reference Signal Receiving Power (RSRP) of a serving cell, measured value of RSRP of a neighbour cell, measured value of Reference Signal Receiving Quality (RSRQ) of the serving cell, measured value of RSRQ of the neighbour cell, position information or time information;
wherein at least one of: the D2D resource pool competition information comprises at least one of the following: a D2D resource competition failure number, a D2D resource competition failure rate or success rate or a D2D resource acquisition time value.

16. An Evolved Node B (eNodeB), comprising:
a processor; and
a memory for storing instructions executable by the processor;
wherein the processor is configured to perform:
sending measurement configuration information of a Device to Device (D2D) resource pool, the measurement configuration information of the D2D resource pool being configured for D2D User Equipment (UE) to measure the D2D resource pool and comprising D2D resource pool indication information, and the D2D resource pool indication information is configured to indicate information of a D2D communication resource pool to be measured; and
receiving measurement information of the D2D resource pool,
wherein the measurement information of the D2D resource pool comprises
D2D resource pool load information, and the D2D resource pool load information comprises:
occupation proportion information of at least one of a time domain or frequency domain of at least one of the D2D resource pool, a Physical Resource Block (PRB), or a D2D discovery resource unit;
before the sending measurement configuration information of the D2D resource pool the processor is further configured to perform at least one of:
receiving the measurement configuration information of the D2D resource pool; or
acquiring D2D resource pool measurement capability information or Minimization of Drive Test (MDT) capability information of the D2D UE;
wherein the D2D resource pool indication information comprises D2D communication data resource pool indication information;
wherein the measurement information of the D2D resource pool further comprises at least one of the following:
D2D resource pool competition information, D2D resource pool indication information, serving cell information at a recording moment, registration Public Land Mobile Network (PLMN) or serving PLMN information, home PLMN or PLMN list information of the D2D resource pool, measured value of Reference Signal Receiving Power (RSRP) of a serving cell, measured value of RSRP of a neighbour cell, measured value of Reference Signal Receiving Quality (RSRQ) of the serving cell, measured value of RSRQ of the neighbour cell, position information or time information;
wherein at least one of the D2D resource pool competition information comprises at least one of the following: D2D resource competition failure number, a D2D resource competition failure rate; or success rate or a D2D resource acquisition time value.

* * * * *